US012069615B2

(12) United States Patent
Vassilovski et al.

(10) Patent No.: US 12,069,615 B2
(45) Date of Patent: Aug. 20, 2024

(54) ENVIRONMENT-DEPENDENT SAFETY MESSAGING

(71) Applicant: QUALCOMM Incorporated, San Diego, CA (US)

(72) Inventors: Dan Vassilovski, Del Mar, CA (US); Anantharaman Balasubramanian, San Diego, CA (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/543,293

(22) Filed: Dec. 6, 2021

(65) Prior Publication Data

US 2023/0180183 A1 Jun. 8, 2023

(51) Int. Cl.
*H04W 72/02* (2009.01)
*G08G 1/01* (2006.01)
*H04W 4/40* (2018.01)
*H04W 72/1263* (2023.01)

(52) U.S. Cl.
CPC ............ *H04W 72/02* (2013.01); *G08G 1/012* (2013.01); *H04W 4/40* (2018.02); *H04W 72/1263* (2013.01)

(58) Field of Classification Search
CPC ... H04W 72/02; H04W 4/40; H04W 72/1263; H04W 4/90; G08G 1/012; G08G 1/164; G08G 1/166; H04L 67/52
See application file for complete search history.

(56) References Cited

U.S. PATENT DOCUMENTS

| 2017/0374530 | A1* | 12/2017 | Ramasamy | G08G 1/207 |
| 2020/0169343 | A1* | 5/2020 | Kodaypak | H04W 76/15 |
| 2021/0160674 | A1 | 5/2021 | Takla | |
| 2022/0167209 | A1* | 5/2022 | Baek | H04W 28/02 |
| 2023/0298468 | A1* | 9/2023 | Jha | H04W 4/46 |
| | | | | 701/117 |
| 2023/0336953 | A1* | 10/2023 | Kwak | H04W 4/40 |

OTHER PUBLICATIONS

Shin, Cheolkyu, et al. "Vehicle-to-everything (v2x) evolution from 4g to 5g in 3gpp: Focusing on resource allocation aspects." IEEE Access 11 (2023): 18689-18703. (Year: 2023).*

(Continued)

*Primary Examiner* — Sharad Rampuria
(74) *Attorney, Agent, or Firm* — Holland & Hart LLP

(57) ABSTRACT

Methods, systems, and devices for wireless communications are described. A user equipment (UE) may transmit a first safety message associated with the UE. The first safety message may be transmitted according to a first periodicity of a set of transmission periodicities for safety message transmissions. The UE may select a second periodicity of the set of transmission periodicities based on one or more environmental conditions associated with the UE. The UE may transmit a second safety message associated with the UE according to the second periodicity of the set of transmission periodicities based at least in part on selecting the second periodicity. The one or more environmental conditions may include topological information, road information, or visibility information. The UE may select the second periodicity based on one or more parameters associated with the UE.

28 Claims, 19 Drawing Sheets

(56) References Cited

OTHER PUBLICATIONS

Chu, Selina, Shrikanth Narayanan, and C-C. Jay Kuo. "Environmental sound recognition with time-frequency audio features." IEEE Transactions on Audio, Speech, and Language Processing 17.6 (2009): 1142-1158. (Year: 2009).*
International Search Report and Written Opinion—PCT/US2022/080742—ISA/EPO—Mar. 29, 2023.

* cited by examiner

ENVIRONMENT-DEPENDENT SAFETY MESSAGING

FIELD OF TECHNOLOGY

The following relates to wireless communications, including environment-dependent safety messaging.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may transmit and receive safety messages, which may alert other UEs (e.g., vehicles) to the presence of vulnerable road users (VRUs). In vehicle-to-everything (V2X) networks, a UE carried by a VRU may transmit safety messages. Safety messages may be unicast, broadcast, groupcast, and multicast. In some cases, examples of safety messages transmitted by a UE may include personal safety messages (PSMs), vulnerable road user awareness messages (VAMs), basic safety messages (BSMs), co-operative awareness messages (CAMs), decentralized environmental notification messages (DENMs), application-layer messages, sensor sharing messages, cooperative perception messages, maneuver coordination messages, or other message types. The safety messages may include information related to a location of the UE, a motion state of the UE, a path history of the UE, path prediction of the UE, or a combination thereof. Vehicles within the V2X network may receive safety messages from nearby UEs and determine to perform one or more actions that may improve safety. In some cases, a UE (e.g., a UE associated with a VRU) may select a periodicity for transmitting a safety message based on the speed of the UE. For example, the UE may transmit PSMs at a periodicity of between 1 and 10 Hertz (Hz) based on the speed of the UE. However, existing methods for transmitting safety messages may be inefficient, may consume excess battery power, and may not effectively improve safety for VRUS.

SUMMARY

The described techniques relate to improved methods, systems, devices, and apparatuses that support environment-dependent safety messaging. Generally, the described techniques provide for a user equipment (UE) and a base station to select a periodicity for safety message transmissions based on environmental conditions. In some cases, selecting the periodicity for safety message transmissions may include selecting the periodicity based on one or more parameters associated with the UE. The UE may transmit a first safety message associated with the UE. The first safety message may be transmitted according to a first periodicity of a sect of transmission periodicities for safety message transmissions. The UE my select a second periodicity of the set of transmission periodicities based on one or more environmental conditions associated with the UE. The UE may transmit a second safety message associated with the UE according to the second periodicity of the set of transmission periodicities based on selecting the second periodicity. In some cases, the base station may select the periodicity of the set of transmission periodicities for safety message transmissions for a UE based on one or more environmental conditions associated with the UE. The base station may transmit, to the UE, a message including an indication of the periodicity. The base station may monitor for at least one safety message from the UE according to the periodicity and based on the indication of the periodicity.

A method for wireless communications at a user equipment (UE) is described. The method may include transmitting a first safety message associated with the UE, the first safety message transmitted according to a first periodicity of a set of transmission periodicities for safety message transmissions, selecting a second periodicity of the set of transmission periodicities based on one or more environmental conditions associated with the UE, and transmitting a second safety message associated with the UE according to the second periodicity of the set of transmission periodicities based on selecting the second periodicity.

An apparatus for wireless communications at a UE is described. The apparatus may include a processor, memory coupled with the processor, and instructions stored in the memory. The instructions may be executable by the processor to cause the apparatus to transmit a first safety message associated with the UE, the first safety message transmitted according to a first periodicity of a set of transmission periodicities for safety message transmissions, select a second periodicity of the set of transmission periodicities based on one or more environmental conditions associated with the UE, and transmit a second safety message associated with the UE according to the second periodicity of the set of transmission periodicities based on selecting the second periodicity.

Another apparatus for wireless communications at a UE is described. The apparatus may include means for transmitting a first safety message associated with the UE, the first safety message transmitted according to a first periodicity of a set of transmission periodicities for safety message transmissions, means for selecting a second periodicity of the set of transmission periodicities based on one or more environmental conditions associated with the UE, and means for transmitting a second safety message associated with the UE according to the second periodicity of the set of transmission periodicities based on selecting the second periodicity.

A non-transitory computer-readable medium storing code for wireless communications at a UE is described. The code may include instructions executable by a processor to transmit a first safety message associated with the UE, the first safety message transmitted according to a first periodicity of a set of transmission periodicities for safety message transmissions, select a second periodicity of the set of transmission periodicities based on one or more environmental conditions associated with the UE, and transmit a second safety message associated with the UE according to the second periodicity of the set of transmission periodicities based on selecting the second periodicity.

In some examples of the method, apparatuses, and non-transitory computer-readable medium described herein, selecting the second periodicity may include operations, features, means, or instructions for selecting the second periodicity based on the topological information, where the topological information corresponds to a location of the UE and indicates a neighborhood type associated with the location of the UE, a presence of one or more potential obstructions between the UE and other UEs, geographical information associated with the location of the UE, or a combination thereof.

In some examples of the method, apparatuses, and non-transitory computer-readable medium described herein, selecting the second periodicity may include operations, features, means, or instructions for selecting the second periodicity based on the road information, where the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

In some examples of the method, apparatuses, and non-transitory computer-readable medium described herein, selecting the second periodicity may include operations, features, means, or instructions for selecting the second periodicity based on the visibility information, where the visibility information corresponds to a weather condition associated with a location of the UE, a time of day associated with the UE, or a combination thereof.

In some examples of the method, apparatuses, and non-transitory computer-readable medium described herein, selecting the second periodicity may include operations, features, means, or instructions for selecting the second periodicity based on a parameter associated with the UE, where the parameter includes a speed of the UE, an acceleration of the UE, an activity of the UE, historical information associated with the UE, or a combination thereof.

Some examples of the method, apparatuses, and non-transitory computer-readable medium described herein may further include operations, features, means, or instructions for activating at least one of an audio component or a video component of the UE and detecting the one or more environmental conditions based on activating at least one of the audio component or the video component of the UE.

In some examples of the method, apparatuses, and non-transitory computer-readable medium described herein, detecting the one or more environmental conditions may include operations, features, means, or instructions for detecting a topology, a neighborhood type, a presence of one or more obstructions, a presence of a shoulder, a presence of a sidewalk, a quantity of vehicles, a visibility condition, or a combination thereof.

In some examples of the method, apparatuses, and non-transitory computer-readable medium described herein, wherein the first safety message, the second safety message, or both comprises a personal safety message (PSM), a vulnerable road user awareness message (VAM), or an application-layer message.

Some examples of the method, apparatuses, and non-transitory computer-readable medium described herein may further include operations, features, means, or instructions for receiving one or more safety messages from one or more other UEs, where the second periodicity may be selected from the set of transmission periodicities based on a quantity of the one or more safety messages relative to a threshold quantity.

Some examples of the method, apparatuses, and non-transitory computer-readable medium described herein may further include operations, features, means, or instructions for determining one or more vehicle types associated with the one or more safety messages, where the second periodicity may be selected based on the one or more vehicle types.

In some examples of the method, apparatuses, and non-transitory computer-readable medium described herein, selecting the second periodicity may include operations, features, means, or instructions for selecting the second periodicity greater than the first periodicity based on the quantity of the one or more safety messages being greater than the threshold quantity or selecting the second periodicity less than the first periodicity based on the quantity of the one or more safety messages being less than the threshold quantity.

In some examples of the method, apparatuses, and non-transitory computer-readable medium described herein, the one or more safety messages includes one or more basic safety messages (BSMs), one or more PSMs, one or more VAMs, one or more co-operative awareness messages (CAMs), one or more decentralized environmental notification messages (DENMs), one or more application-layer messages, or any combination thereof.

A method for wireless communications at a base station is described. The method may include selecting a periodicity of a set of transmission periodicities for safety message transmissions for a UE based on one or more environmental conditions associated with the UE, transmitting, to the UE, a message including an indication of the periodicity, and monitoring for at least one safety message from the UE according to the periodicity and based on the indication of the periodicity.

An apparatus for wireless communications at a base station is described. The apparatus may include a processor, memory coupled with the processor, and instructions stored in the memory. The instructions may be executable by the processor to cause the apparatus to select a periodicity of a set of transmission periodicities for safety message transmissions for a UE based on one or more environmental conditions associated with the UE, transmit, to the UE, a message including an indication of the periodicity, and monitor for at least one safety message from the UE according to the periodicity and based on the indication of the periodicity.

Another apparatus for wireless communications at a base station is described. The apparatus may include means for selecting a periodicity of a set of transmission periodicities for safety message transmissions for a UE based on one or more environmental conditions associated with the UE, means for transmitting, to the UE, a message including an indication of the periodicity, and means for monitoring for at least one safety message from the UE according to the periodicity and based on the indication of the periodicity.

A non-transitory computer-readable medium storing code for wireless communications at a base station is described. The code may include instructions executable by a processor to select a periodicity of a set of transmission periodicities for safety message transmissions for a UE based on one or more environmental conditions associated with the UE, transmit, to the UE, a message including an indication of the periodicity, and monitor for at least one safety message from the UE according to the periodicity and based on the indication of the periodicity.

In some examples of the method, apparatuses, and non-transitory computer-readable medium described herein, selecting the periodicity may include operations, features, means, or instructions for selecting the periodicity based on the topological information, where the topological information corresponds to a location of the UE and indicates a neighborhood type associated with the location of the UE, a presence of one or more potential obstructions between the UE and other UEs, geographical information associated with the location of the UE, or a combination thereof.

In some examples of the method, apparatuses, and non-transitory computer-readable medium described herein, selecting the periodicity may include operations, features, means, or instructions for selecting the periodicity based on the road information, where the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

In some examples of the method, apparatuses, and non-transitory computer-readable medium described herein, selecting the periodicity may include operations, features, means, or instructions for selecting the periodicity based on the visibility information, where the visibility information corresponds to a weather condition associated with a location of the UE, a time of day associated with the UE, or a combination thereof.

In some examples of the method, apparatuses, and non-transitory computer-readable medium described herein, selecting the periodicity may include operations, features, means, or instructions for selecting the periodicity based on a parameter associated with the UE, where the parameter includes a speed of the UE, an acceleration of the UE, an activity of the UE, historical information associated with the UE, or a combination thereof.

In some examples of the method, apparatuses, and non-transitory computer-readable medium described herein, the at least one safety message includes a PSM, a VAM, or an application-layer message.

Some examples of the method, apparatuses, and non-transitory computer-readable medium described herein may further include operations, features, means, or instructions for receiving one or more safety messages from one or more other UEs, where the periodicity may be selected from the set of transmission periodicities based on a quantity of the one or more safety messages relative to a threshold quantity.

Some examples of the method, apparatuses, and non-transitory computer-readable medium described herein may further include operations, features, means, or instructions for determining one or more vehicle types associated with the one or more safety messages, where the periodicity may be selected based on the one or more vehicle types.

In some examples of the method, apparatuses, and non-transitory computer-readable medium described herein, selecting the periodicity may include operations, features, means, or instructions for selecting the periodicity greater than a first periodicity based on the quantity of the one or more safety messages being greater than the threshold quantity or selecting the periodicity less than the first periodicity based on the quantity of the one or more safety messages being less than the threshold quantity.

In some examples of the method, apparatuses, and non-transitory computer-readable medium described herein, the one or more safety messages includes one or more BSMs, one or more PSMs, one or more VAMs, one or more CAMs, one or more DENMs, one or more application-layer messages, one or more sensor sharing messages, one or more cooperative perception messages, one or more maneuver coordination messages, or any combination thereof.

DETAILED DESCRIPTION

Figure 1:
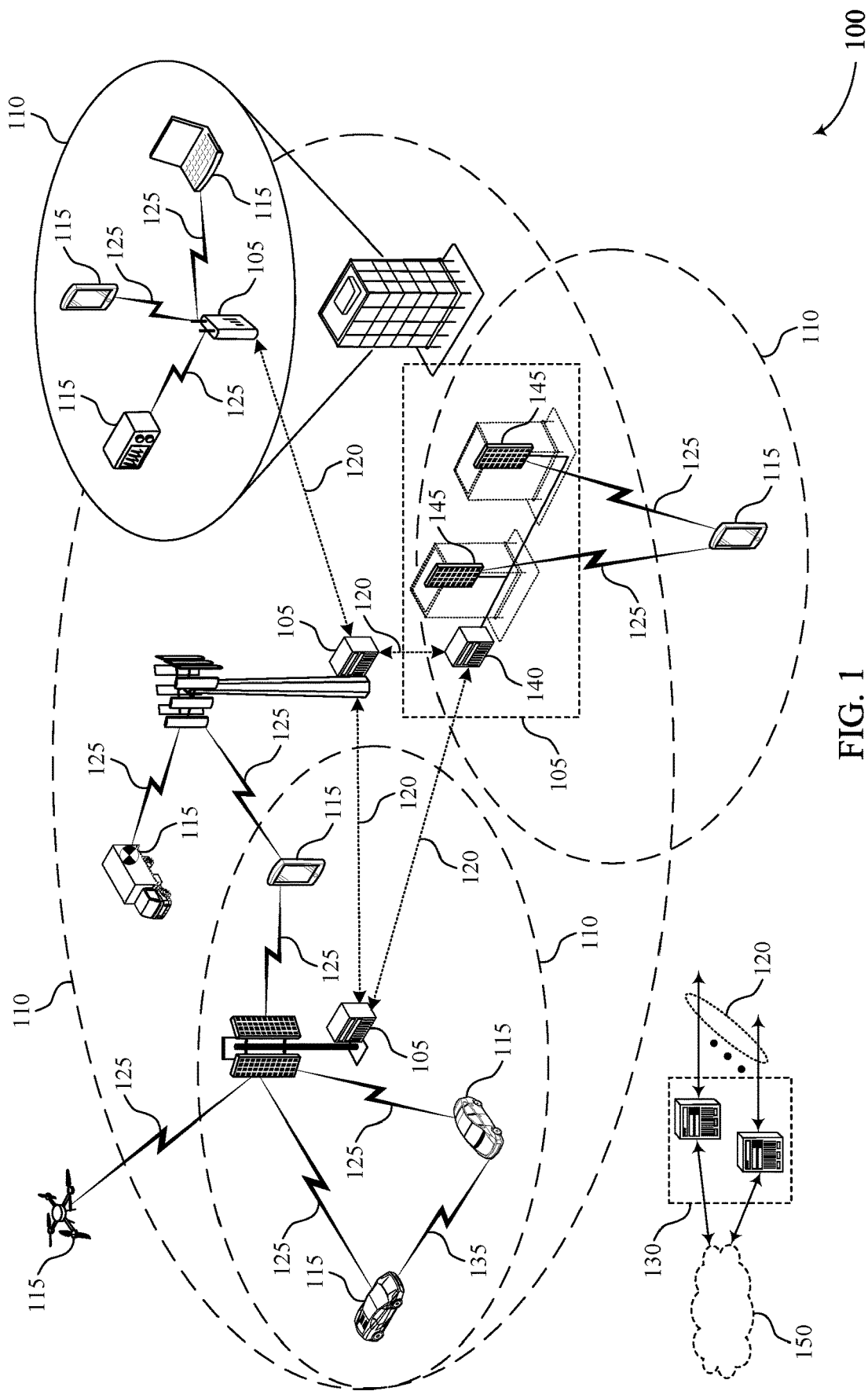
FIG. 1 illustrates an example of a wireless communications system that supports environment-dependent safety messaging in accordance with aspects of the present disclosure.

Some wireless networks may support signaling for improving safety of vulnerable road users (VRUs). For example, in a vehicle-to-everything (V2X) network, a user equipment (UE) carried by a VRU may transmit safety messages to other UEs, such as vehicles. In some cases, examples of safety messages transmitted by a UE may include personal safety messages (PSMs), vulnerable road user awareness messages (VAMs), basic safety messages (BSMs), co-operative awareness messages (CAMs), decentralized environmental notification messages (DENMs), application-layer messages, sensor sharing messages, cooperative perception messages, maneuver coordination messages, or other message types. The safety messages may include information related to a location of the UE, a motion state of the UE, a path history of the UE, path prediction of the UE, or a combination thereof. Vehicles within the V2X network may receive safety messages from nearby UEs and determine to perform one or more actions that may improve safety. In some cases, a UE (e.g., a UE associated with a VRU) may select a periodicity for transmitting a safety message based solely on the speed of the UE. For example, the UE may transmit PSMs at a periodicity of between 1 and 10 Hertz (Hz) based on the speed of the UE. In some cases, selecting a periodicity for transmitting safety messages based solely on the speed of the UE may be overly conservative. For example, a UE may be stationary, and accordingly select a safety message transmission periodicity of 1 Hz. However, one or more potential safety hazards not associated with the speed of the UE may be present, such as a high density of nearby vehicles. Thus, safety message transmission periodicity that depends on only the UE speed may not effectively take into consideration other factors that may be used to improve safety or identify other hazards.

In accordance with the techniques described herein, a UE (e.g., a UE associated with a VRU) may select a periodicity for safety message transmissions based on environmental conditions associated with the UE. The environmental conditions may include vehicle density such as a number of vehicles in a vicinity of the UE, topological information (e.g., a neighborhood type, a presence of one or more potential obstructions between the UE and other UEs, geographical information associated with the location of the UE), road information (e.g., a road topology, a presence of a sidewalk, a presence of a shoulder, a presence of a bicycle lane, a presence of a median, one or more intersections, a number of lanes, a presence of one or more turning lanes, one or more lane widths) an activity performed by the user of the UE, a type of vehicle within the vicinity of the UE, or visibility conditions (e.g., weather, time of day). In some cases, the UE may determine the environmental conditions based on receiving signaling from vehicles or other UEs. For example, the UE may receive one or more PSMs, VAMs, BSMs, CAMs, DENMs, application-layer messages, sensor sharing messages, cooperative perception messages, maneuver coordination messages, or other message types from other UEs. In other cases, the UE may determine the environmental conditions based on information collected by, stored by, or accessed by the UE. For example, the UE may activate an audio or video component, and determine a visibility condition or a vehicle density condition based on information measured by the audio or the video component. Alternatively, a base station may use similar selection techniques and transmit an indication to a UE based on the environment. The indication may indicate a periodicity for safety message transmissions.

Aspects of the disclosure are initially described in the context of wireless communications systems. Aspects of the disclosure are further illustrated by and described with reference to V2X environments, process flows, apparatus diagrams, system diagrams, and flowcharts that relate to environment-dependent safety messaging.

FIG. 1 illustrates an example of a wireless communications system 100 that supports environment-dependent safety messaging in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information: and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot Nf)$ seconds, where $\Delta f_{max}$ may represent the maximum supported subcarrier spacing, and $Nf$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., Nf) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHZ.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna array's or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, the wireless communications system 100 may include UEs 115 and base stations 105, which may support signaling techniques to improve the safety of VRUs. For example, a UE 115 may be carried by a VRU, such as a pedestrian. The VRU may transmit safety messages to other UEs 115, such as vehicles, and the other UEs may determine to perform one or more actions based on receiving the one or more safety messages. In some cases, a UE 115 may transmit one or more safety messages at a periodicity. The periodicity may be based solely on the speed of the UE 115, however, determining a periodicity of safety messaged based solely on UE 115 speed may not effectively account for other factors that may be used to improve safety or identify other hazards.

Various aspects of the present disclosure relate to a UE 115 selecting a periodicity for safety message transmissions based on environmental conditions associated with the UE 115. The environmental conditions may include a density of nearby vehicles, topological information, road information, an activity performed by the user of the UE 115, a type of vehicle within a vicinity of the UE 115, visibility conditions, other conditions, or any combination thereof. The UE 115 may determine conditions based on safety messages received from other UEs 115 (e.g., vehicles, wireless devices), or based on information collected by, stored by, or accessed by the UE 115. In some cases, a base station 105 may determine the periodicity for safety message transmission based on environmental conditions. Additionally, or alternatively, the base station 105 may transmit an indication of the periodicity to a UE 115.

As described herein, the term "VRU" may be used to refer to a VRU associated with a UE 115. For example, a pedestrian carrying or otherwise associated with a UE may be an example of a VRU. Similarly, a cyclist, a runner, or any other example of a person within the vicinity of one or more vehicles may be referred to as a VRU. As described herein, the term VRU is understood to be generally associated with one or more UEs 115. Additionally, or alternatively, as described herein, the acronym "UE" (e.g., UE 115) may be used to describe wireless devices such as cellular phones as well as vehicles. For examples, vehicles in the wireless communications system 100 may be referred to as UEs 115.

Figure 2:
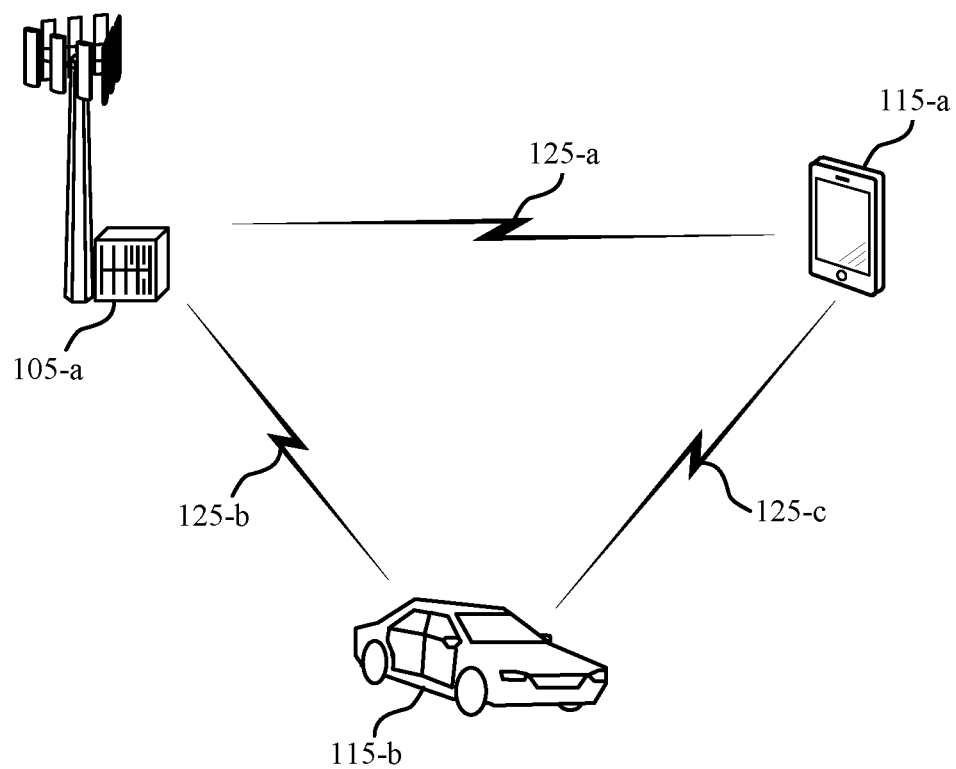
FIG. 2 illustrates an example of a wireless communications system that supports environment-dependent safety messaging in accordance with aspects of the present disclosure.

FIG. 2 illustrates an example of a wireless communications system 200 that supports environment-dependent safety messaging in accordance with aspects of the present disclosure. The wireless communications system 200 may implement aspects of the wireless communications system 100. For example, the wireless communications system 200 may include a base station 105-a, a UE 115-a, and a UE 115-b, which may be examples of a corresponding base station 105 and UEs 115 as described with reference to FIG. 1. In some cases, the base station 105-a and the UEs 115 may communicate over communication links 125, which may be examples of communication links 125 as described with reference to FIG. 1. As described herein, a UE 115 may be associated with a VRU. For example, the UE 115-a may be carried by a VRU, such as a pedestrian. Additionally or alternatively, a vehicle in a V2X network may be an example of a UE 115. For example, the UE 115-b may be a vehicle in a V2X network.

The wireless communications system 200 may support signaling for improving safety of VRUs. For example, the UE 115-a may be configured to transmit safety messages, which may alert other UEs 115 to a presence or a trajectory of the UE 115-a. In some cases, the UE 115-a may be associated with (e.g., carried by) a VRU. The VRU may be located on or near a roadway, within a vicinity of the UE 115-b. In some cases, the VRU may be performing an activity within the vicinity of the UE 115-b, such as walking, running, cycling, or any other activity where the VRU may be positioned within a proximity of the UE 115-b or a roadway. In such cases, the UE 115-a may be configured to transmit (e.g., broadcast, groupcast, multicast) one or more safety messages, which may be received by the UE 115-b. The UE 115-b may receive the one or more safety messages and perform one or more actions based on receiving the one or more safety messages. For example, the UE 115-b may receive the one or more safety messages and perform one or more collision avoidance operations, reduce or increase its speed, perform a lane change, or any other operation which may result in improved safety conditions for the VRU.

The wireless communications system 200 may support a variety of safety message types. In some cases, safety messages may be transmitted by the UE 115-a. In other cases, safety messages may be transmitted by the UE 115-b, the base station 105-a, a roadside unit (RSU), or any other network device. In some cases, UEs 115, such as vehicles, may be configured for specific safety message types. Similarly, some UEs 115, such as cellular phones, and other network devices may be configured for other safety message types. In some cases, safety messages transmitted by the UE 115-*b* may include one or more BSMs, one or more CAMs, one or more DENMs, one or more application-layer messages, one or more sensor sharing messages, one or more cooperative perception messages, one or more maneuver coordination messages, or one or more other message types. In some cases, safety messages transmitted by the UE 115-*a* may include one or more PSMs, one or more VAMs, one or more application-layer messages, or one or more other message types. In some cases, safety messages transmitted by network devices, such as the base station 105-*a* or an RSU may include one or more cooperative perception messages, one or more sensor sharing messages, one or more maneuver coordination messages, or one or more other message types.

Safety messages transmitted by UEs 115 may include information related to the UE 115 and the user of the UE 115 (e.g., a VRU). The UE 115-*a* may transmit (e.g., broadcast) a safety message indicating a location of the UE 115-*a*, a motion state of the UE 115-*a* (e.g., if the UE 115-*a* is in motion, if the UE 115-*a* is stationary, a speed of the UE 115-*a*, a velocity of the UE 115-*a*, an acceleration of the UE 115-*a*), historical (e.g., learned) information associated with the UE 115-*a* (e.g., a path history of the UE 115-*a*), predictive information associated with the UE 115-*a* or other information. The information included in the safety message transmitted by the UE 115-*a* may be implicitly associated with the user of the UE 115-*a* (e.g., a VRU). For example, a VRU may perform an activity such as walking, or the VRU may be stationary and the UE 115-*a* may store, measure, or transmit information associated with the VRU, such as information related to the speed or position of the VRU.

The UE 115-*a* may broadcast one or more safety messages (e.g., PSMs), which may include the information associated with the VRU. Accordingly, one or more UEs 115-*b* may receive the one or more safety messages and perform one or more actions based on receiving the one or more safety messages. For example, the UE 115-*b* may receive a PSM from the UE 115-*a*, which may indicate that the VRU carrying the UE 115-*a* is performing an activity, such as cycling, within a proximity of the UE 115-*b*. The PSM may additionally or alternatively indicate a speed of the VRU or a path prediction associated with the VRU. The UE 115-*b* may determine to reduce its speed or perform a lane change based on receiving the PSM including the path predication associated with the VRU. As a result, the likelihood of a collision between the UE 115-*b* and the VRU may be reduced and safety may be improved for the VRU and the driver of the UE 115-*b*. Additionally or alternatively, the UE 115-*a* may transmit one or more safety messages, which may be received by one or more RSUs. The one or more RSUs may receive the one or more safety messages and may perform one or more actions based on receiving the one or more safety messages. For example, an RSU may retransmit a safety message to a UE 115-*b* or one or more other RSUs.

In some cases, UEs 115 may be configured to transmit safety messages at a periodicity. For example, the base station 105-*a* may configure the UE 115 to transmit safety messages at a periodicity. In other examples, the UE 115 may determine to transmit safety messages at a periodicity (e.g., without receiving control signaling from the base station 105-*a*). The UE 115 or the base station 105-*a* may select the periodicity for safety message transmissions from a set of periodicities. For example, the UE 115 may select a periodicity between 1 and 10 Hz. In some cases, the UE 115 or the base station 105-*a* may select the periodicity based on the speed of the UE 115. In some cases, selecting a periodicity for transmitting safety messages based solely on the speed of the UE 115 may be overly conservative. For example, a UE 115 may be stationary, and accordingly may select a safety message transmission periodicity of 1 Hz. However, one or more potential safety hazards not associated with the speed of the UE 115 may be present, such as a high density of nearby vehicles. Thus, selecting a periodicity for safety message transmission based solely on the speed of the UE 115 may not effectively account for other factors that may be associated with potential safety hazards for VRUs.

Some environmental conditions may be associated with reduced safety for VRUs. That is, some locations (e.g., environments) may be associated with higher densities of UEs 115-*b* (e.g., vehicles), which may pose safety hazards to VRUs. For example, intersections and urban areas may generally have higher vehicle density that rural areas. Additionally or alternatively, VRUs may be more readily visible during the day than at night. In accordance with the techniques described herein, a UE 115 or a base station 105-*a* may select a periodicity for safety message transmissions based on environmental conditions associated with the UE 115. The UE 115 may detect one or more environmental conditions based on one or more messages received from the base station 105-*a* (e.g., via communication link 125-*a*) or from an RSU (e.g., via a D2D link). Additionally or alternatively, the UE 115 may detect one or more environmental conditions based on information or parameters associated with the UE 115 (e.g., a location of the UE 115, a time of day associated with the UE 115, stored information (e.g., mapping or topological information) of the UE 115, sensor information from a component of the UE 115, visibility information). The environmental conditions may include information related to UEs 115-*b* (e.g., vehicles), information relation to infrastructure and road design, visibility information, and other information stored by, measured by, or accessed by the UE 115. For example, the UE 115-*a* may select a periodicity for safety message transmission based on one or more parameters associated with the UE 115 such as parameters related to motion and location of the UE 115-*a*. In some cases, the UE 115 or the base station 105-*a* selecting a periodicity for safety message transmission based on environmental conditions may result in greater safety for VRUs, greater safety message signaling efficiency and improve UE 115 battery utilization.

In some cases, the UE 115 or the base station 105-*a* may select a safety message transmission periodicity based on detecting one environmental condition or based on detecting a combination of environmental conditions. For example, the UE 115 or the base station 105-*a* may select a maximum periodicity for safety message transmissions based on detecting a vehicle density exceeding a configured threshold, a vehicle type larger than a configured type, poor visibility, or a road scenario. In some cases, poor visibility may be associated with a time or day or a type or environment (e.g., an urban environment). In some cases, a road scenario may be associated with a signalized intersection or a multi-lane road.

In some cases, the UE 115 or the base station 105-*a* may select a safety message transmission periodicity based on detecting a combination of environmental conditions. For example, the UE 115 or the base station 105-*a* may select a maximum periodicity for safety message transmissions based on detecting a combination of a vehicle density and a visibility condition. Similarly, the UE 115 or the base station 105-*a* may select a maximum periodicity for safety message transmissions based on detecting a combination of a vehicle density and a presence of a bike lane, shoulder, or sidewalk. In some cases, the maximum periodicity for safety message transmissions may be 10 Hz.

In some cases, the UE 115 or the base station 105-a may select a safety message transmission periodicity based on a weighting (e.g., a hierarchy) corresponding to one or more environmental conditions. In such cases, the UE 115 or the base station 105-a may select a safety message transmission periodicity between a minimum (e.g., 1 Hz) and a maximum (e.g., 10 Hz) periodicity. For example, the UE 115 and the base station 105-a may select the safety message transmission periodicity based on weighting associated with multiple environmental conditions, such as a combination of a VRU activity and a visibility condition.

Figure 3A:
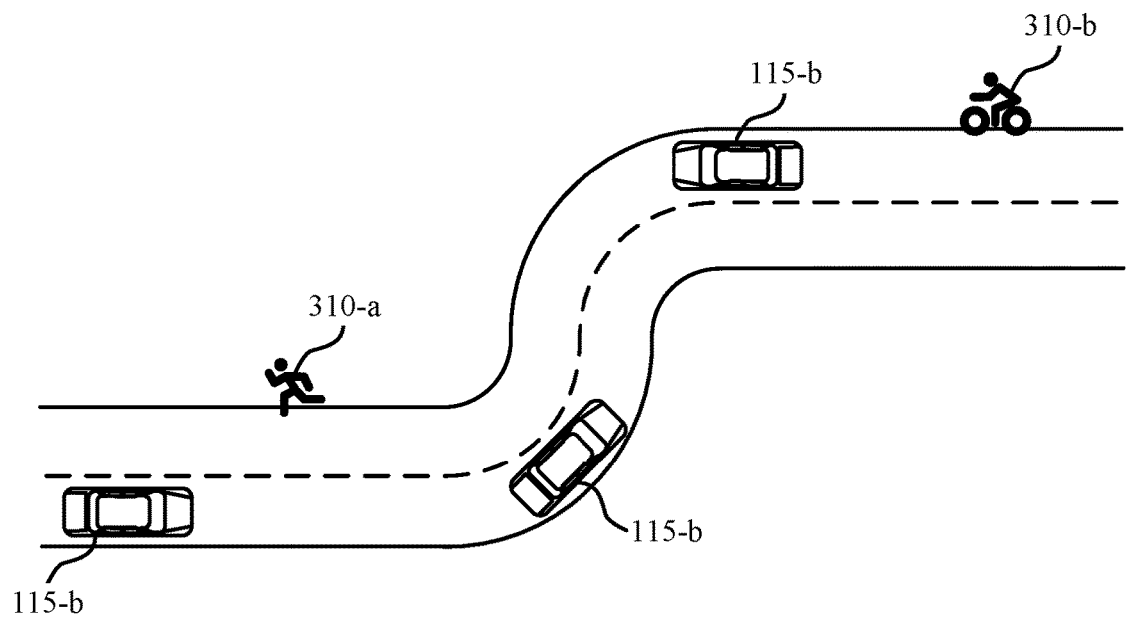
FIGS. 3A and 3B illustrate examples of vehicle-to-everything (V2X) environments that support environment-dependent safety messaging in accordance with aspects of the present disclosure.
Figure 3B:
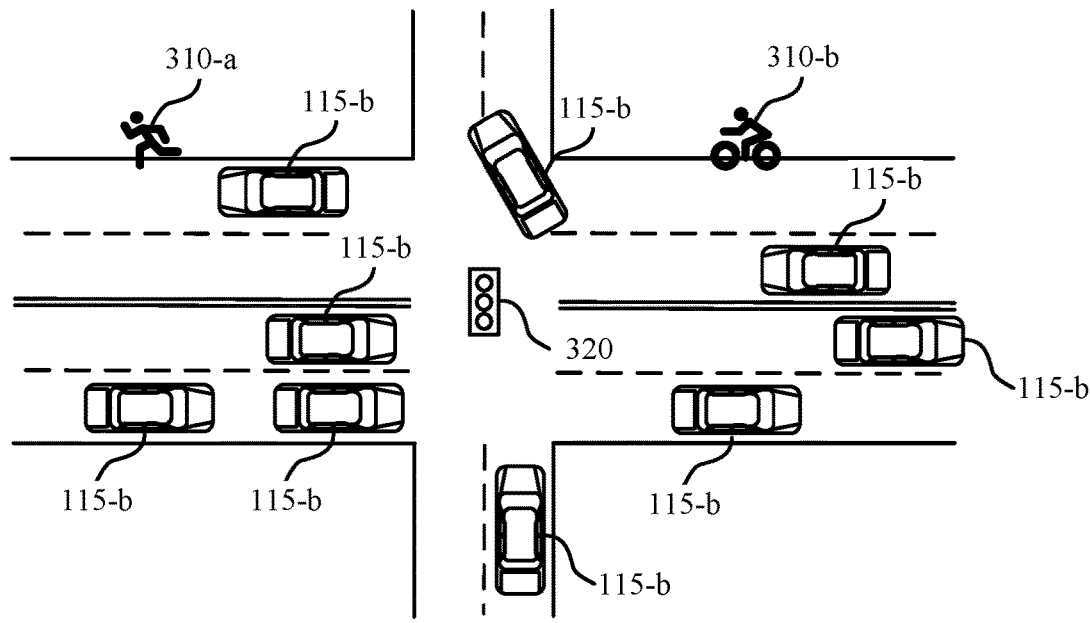

FIGS. 3A and 3B illustrate examples of V2X environments 300 that support environment-dependent safety messaging in accordance with aspects of the present disclosure. The V2X environments 300 may implement aspects of the wireless communications systems 100 and 200. For example, the V2X environments 300 may include UEs 115-b, which may be examples of a corresponding UE 115-b as described with reference to FIG. 2 and a corresponding UE 115 as described with reference to FIG. 1. FIGS. 3A and 3B may include UEs 115-b, which may be examples of vehicles. The V2X environments 300 may additionally include VRUs 310. As described herein, VRUs 310 may be associated with UEs 115, such as cellular phones or other wireless devices, which are not shown. For example, VRUs 310 may carry UEs 115. As described herein, the term "UE 115" may be used to describe vehicles (e.g., the UEs 115-b), cellular phones (not shown) associated with VRUs 310 or other types of UEs 115.

A VRU 310, as described herein may be an example of a road user or a person otherwise located within the vicinity of road, or other area where UEs 115-b are operated. For example, the VRU 310-a and the VRU 310-a may be examples of runners or joggers. The VRU 310-b and the VRU 310-b may be examples of cyclists. The VRUs 310 may be located within a vicinity of a road. For example, the VRUs 310 may be located within a same lane of a road as a UE 115-b. Additionally or alternatively, VRUs 310 may be located on a shoulder of a road, in a bike lane, on a sidewalk, or in a median. In some cases, one or more VRUs 310 may be located within a vicinity of one or more UEs 115-b, which may present safety hazards. Although the VRU 310-a may be described herein as a runner, and the VRU 310-b may be generally described herein as a cyclist, the VRUs 310 may represent any example of road users, pedestrians, or people located within a proximity of a road or UEs 115-b.

A UE 115 (e.g., a wireless device) carried by or otherwise associated with a VRU 310 may determine a vehicle density associated with a V2X environment 300 (e.g., a quantity of UEs 115-b within a distance of the VRU). The UE 115 may determine the vehicle density using a variety of techniques. For example, the UE 115 may receive one or more safety messages from one or more UEs 115-b. The safety messages received from the one or more UEs 115-b may be BSMs, CAMs, DENMs, application-layer messages (e.g., signal phase and timing (SPAT) messages, intersection map (MAP) messages), sensor sharing messages, cooperative perception messages, maneuver coordination messages, or any other safety message type. The UE 115 may determine the vehicle density based on a quantity of received safety messages or based on information included in one or more received safety messages.

The UE 115 may additionally or alternatively determine the vehicle density based on road topology or neighborhood type from stored or downloaded map information (e.g., from Google Maps, from Apple Maps). For example, the UE 115 may access or read information from one or more mapping applications and determine the vehicle density based on the information. In some cases, the UE 115 may determine a relationship between road topology and vehicle density or neighborhood type and vehicle density. Accordingly, the UE 115 may determine the vehicle density based on road topology or neighborhood type. Additionally or alternatively, the UE 115 may detect the vehicle density based on audio or video detection. For example, the UE 115 may activate one or more cameras or microphones and measure one or more parameters associated with vehicle density. In some cases, the UE 115 may perform a plurality of the techniques described herein through a data fusion approach.

FIG. 3A may illustrate a V2X environment 300-a corresponding to a low vehicle density. For example, a quantity of UEs 115-b may be below a threshold quantity of UEs 115-b. Accordingly, the UE 115 may determine that the quantity of UEs 115-b is below the threshold quantity of UEs 115-b and may decrease a periodicity of safety message transmissions. For example, the VRU 310-a may be associated with the UE 115. The UE 115 may receive safety messages from the UEs 115-b and may determine that the quantity of UEs 115-b falls below a threshold quantity. Additionally or alternatively, the UE 115 may access or read information from one or more mapping applications, the UE 115 may access or read information from an audio or video component of the UE 115, or any combination thereof. The UE 115 may determine that a quantity of UEs 115-b does not exceed a threshold and may decrease a periodicity of safety transmissions. For example, the UE 115 may select a periodicity of 1 Hz or any other periodicity lower than an initial periodicity for safety message transmissions.

FIG. 3B may illustrate a V2X environment 300-b corresponding to a high vehicle density. For example, a quantity of UEs 115-b may be above a threshold quantity of UEs 115-b. Accordingly, the UE 115 may determine that the quantity of UEs 115-b is above the threshold quantity of UEs 115-b and may increase a periodicity of safety message transmissions. For example, the VRU 310-a may be associated with the UE 115. The UE 115 may receive safety messages from the UEs 115-b and may determine that the quantity of UEs 115-b falls below a threshold quantity. Additionally or alternatively, the UE 115 may access or read information from one or more mapping applications, the UE 115 may access or read information from an audio or video component of the UE 115, or any combination thereof. For example, the UE 115 may access or read information from a mapping application, which may indicate the presence of one or more traffic signals 320. The UE 115 may determine that the V2X environment 300-b is a high vehicle density environment based on the presence of the one or more traffic signals 320. Accordingly, the UE 115 may increase a periodicity of safety transmissions based on determining that the V2X environment 300-b is a high vehicle density environment. For example, the UE 115 may select a periodicity of 10 Hz or any other periodicity higher than an initial periodicity for safety message transmissions.

Figure 4A:
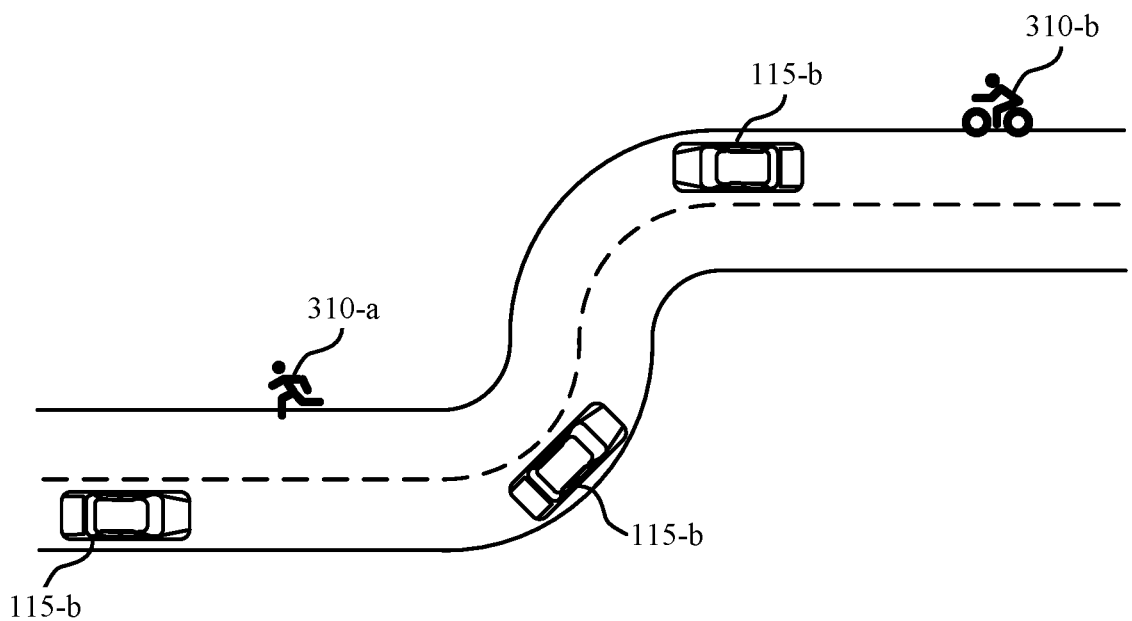
FIGS. 4A and 4B illustrate examples of V2X environments that support environment-dependent safety messaging in accordance with aspects of the present disclosure.
Figure 4B:
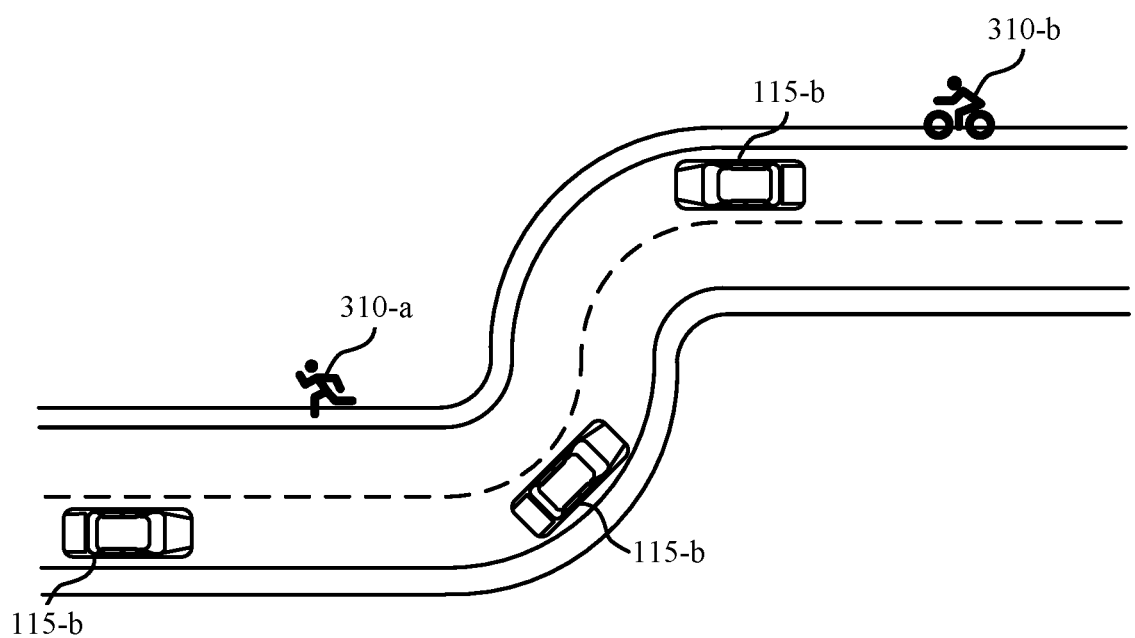

FIGS. 4A and 4B illustrates examples of V2X environments 400 that support environment-dependent safety messaging in accordance with aspects of the present disclosure. The V2X environments 400 may implement aspects of the wireless communications systems 100 and 200. For example, the V2X environments 400 may include UEs 115-*b*, which may be examples of a corresponding UE 115-*b* as described with reference to FIG. 2 and a corresponding UE 115 as described with reference to FIG. 1. FIGS. 4A and 4B may include UEs 115-*b*, which may be examples of vehicles. The V2X environments 400 may additionally include VRUs 310. As described herein, VRUs 310 may be associated with UEs 115, such as cellular phones or other wireless devices, which are not shown. For example, VRUs 310 may carry UEs 115. As described herein, the term "UE 115" may be used to describe vehicles (e.g., the UEs 115-*b*), cellular phones (not shown) associated with VRUs 310 or other types of UEs 115.

A UE 115 (e.g., a wireless device) carried by or otherwise associated with a VRU 310 may determine a presence of one or more shoulders or sidewalks. Additionally or alternatively, the UE 115 may determine any road condition, which may improve the safety of a VRU 310 such as a presence of a bicycle lane, a presence of a median, or a lane width. In some cases, the UE 115 may determine the road condition (e.g., the presence of a shoulder) based on stored, downloaded, or accessed map information. In some other cases, the UE 115 may determine the road condition based on activating a video component of the UE 115 (e.g., camera detection).

FIG. 4A may illustrate a V2X environment 400-*a* corresponding to a road without a shoulder, sidewalk, or bicycle lane. For example, a UE 115 associated with a VRU 310 may determine that the road does not have a shoulder. The UE 115 may determine that the road does not have a shoulder based on camera detection or map information. Accordingly, the UE 115 may increase a periodicity of safety message transmissions based on determining that the road does not have a shoulder. For example, the UE 115 may select a periodicity of 10 Hz or any other periodicity higher than an initial periodicity for safety message transmissions.

FIG. 4B may illustrate a V2X environment 400-*b* corresponding to a road with a shoulder. For example, a UE 115 associated with a VRU 310 may determine that the road has a shoulder. The UE 115 may determine that the road has the shoulder based on camera detection or map information. Accordingly, the UE 115 may decrease a periodicity of safety message transmissions based on determining that the road has a shoulder. For example, the UE 115 may select a periodicity of 1 Hz or any other periodicity lower than an initial periodicity for safety message transmissions.

Figure 5A:
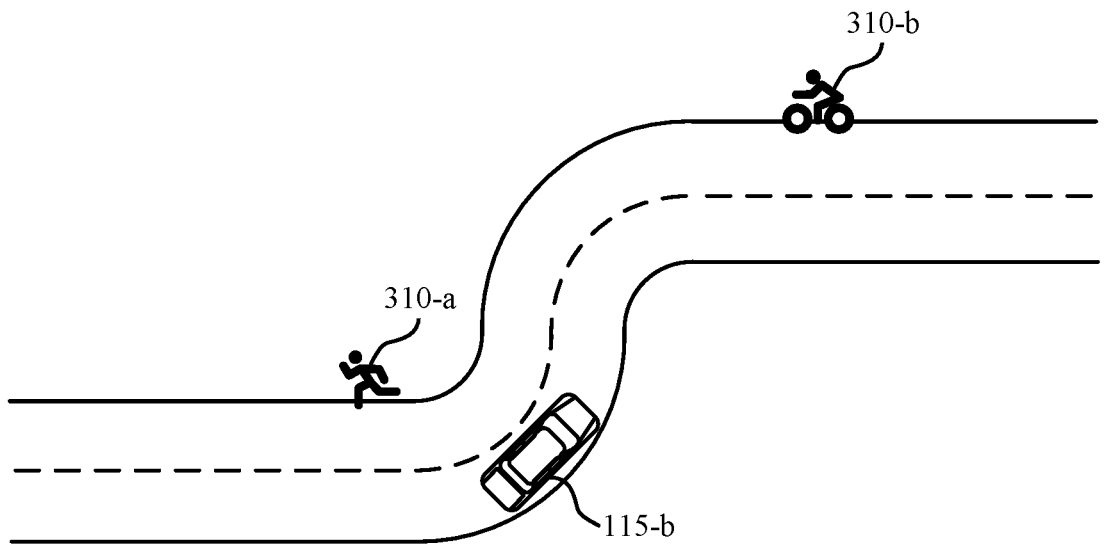
FIGS. 5A and 5B illustrate examples of V2X environments that support environment-dependent safety messaging in accordance with aspects of the present disclosure.
Figure 5B:
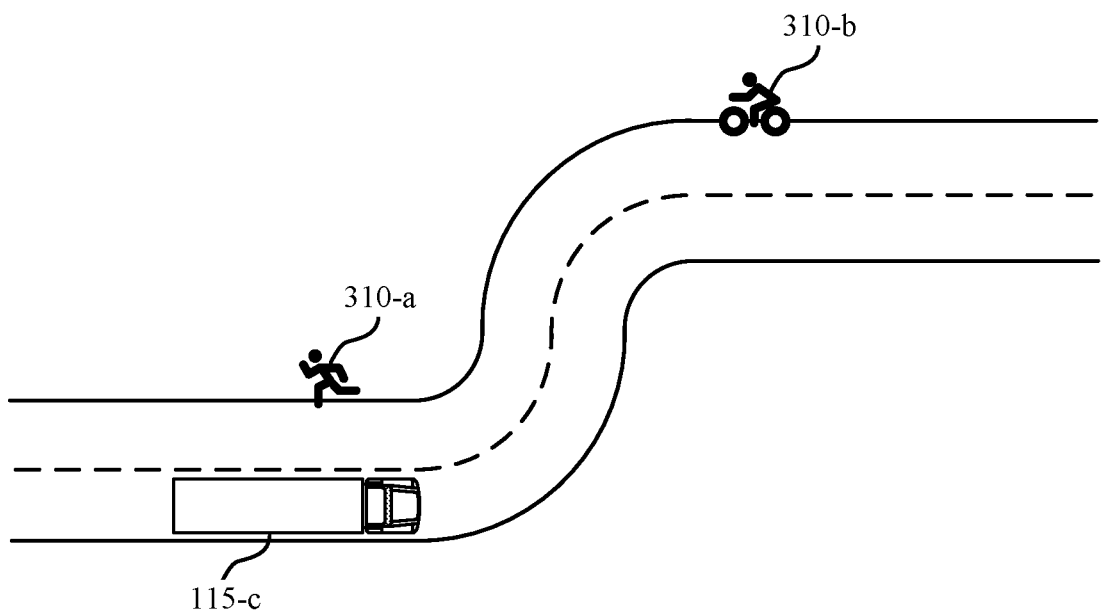

FIGS. 5A and 5B illustrate examples of V2X environments 500 that support environment-dependent safety messaging in accordance with aspects of the present disclosure. The V2X environments 500 may implement aspects of the wireless communications systems 100 and 200. For example, the V2X environments 500 may include a UE 115-*b* and a UE 115-*c*, which may be examples of a corresponding UE 115-*b* as described with reference to FIG. 2 and a corresponding UE 115 as described with reference to FIG. 1, respectively. FIG. 5A may include the UE 115-*b*, which may be an example of a vehicle such as a car. FIG. 5B may include the UE 115-*c*, which may be an example of a vehicle such as a truck. The V2X environments 500 may additionally include VRUs 310. As described herein, VRUs 310 may be associated with UEs 115, such as cellular phones or other wireless devices, which are not shown. For example, VRUs 310 may carry UEs 115. As described herein, the term "UE 115" may be used to describe vehicles (e.g., the UE 115-*b* and the UE 115-*c*), cellular phones (not shown) associated with VRUs 310 or other types of UEs 115.

A UE 115 (e.g., a wireless device) carried by or otherwise associated with a VRU 310 may determine one or more vehicles types. For example, a UE 115 may determine a vehicle type of the UE 115-*b* or of the UE 115-*c*. In some cases, a vehicle type may be associated with a vehicle size or may otherwise be related to one or more potential safety hazards associated with the vehicle. In some cases, the vehicle type may be indicated in one or more safety messages transmitted by a UE 115-*b* or a UE 115-*c*. For example, a BSM or an application-layer message may include an indication of a vehicle type. In some other cases, a vehicle type may be indicated during as part of sensor sharing or maneuver sharing. A UE 115 may receive one or more safety messages from a vehicle (e.g., from the UE 115-*b* or the UE 115-*c*) and determine the vehicle type based on receiving the one or more safety messages.

FIG. 5A may illustrate a V2X environment 500-*a* corresponding to a first vehicle type within a vicinity of the VRU 310. For example, a UE 115 carried by a VRU 310-*a* or a VRU 310-*b* may receive one or more safety messages from the UE 115-*b*. The one or more safety messages may include one or more BSMs, one or more CAMs, one or more DENMs, one or more sensor sharing messages, one or more cooperative perception messages, one or more maneuver coordination messages, or one or more application-layer messages. In some cases, the one or more application-layer messages may be associated with sensor sharing or maneuver sharing. The one or more safety messages transmitted by the UE 115-*b* may include an indication of a vehicle type. For example, the UE 115-*b* may broadcast one or more BSMs, which may indicate that the UE 115-*b* is a small vehicle, such as a car, a compact vehicle, a sedan, or any other small vehicle type or classification. The UE 115 carried by the VRU 310-*a* or the VRU 310-*b* may receive the safety message from the UE 115-*b* and may decrease a periodicity of safety message transmissions based on determining that the UE 115-*b* is a small vehicle.

FIG. 5B may illustrate a V2X environment 500-*b* corresponding to a second vehicle type within a vicinity of the VRU 310. For example, a UE 115 carried by a VRU 310-*a* or a VRU 310-*b* may receive one or more safety messages from the UE 115-*c*. The one or more safety messages may include one or more BSMs, one or more CAMs, one or more DENMs, one or more sensor sharing messages, one or more cooperative perception messages, one or more maneuver coordination messages, or one or more application-layer messages. In some cases, the one or more application-layer messages may be associated with sensor sharing or maneuver sharing. The one or more safety messages transmitted by the UE 115-*c* may include an indication of a vehicle type. For example, the UE 115-*c* may broadcast one or more BSMs, which may indicate that the UE 115-*c* is a large vehicle, such as a semi-trailer truck, an articulated vehicle, a bus, a sport utility vehicle (SUV), a van, or any other large vehicle type or classification. The UE 115 carried by the VRU 310-*a* or the VRU 310-*b* may receive the safety message from the UE 115-*c* and may increase a periodicity of safety message transmissions based on determining that the UE 115-*c* is a large vehicle.

Figure 6A:
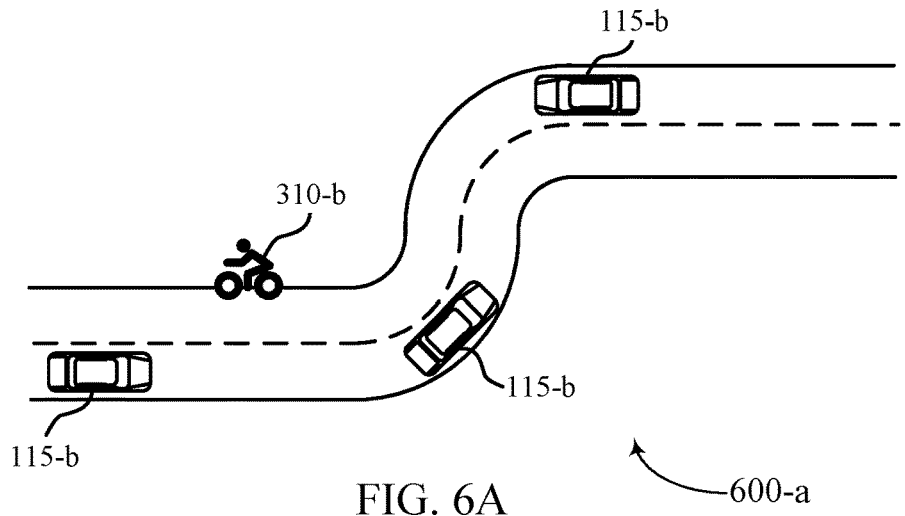
FIGS. 6A, 6B, and 6C illustrate examples of V2X environments that support environment-dependent safety messaging in accordance with aspects of the present disclosure.
Figure 6B:
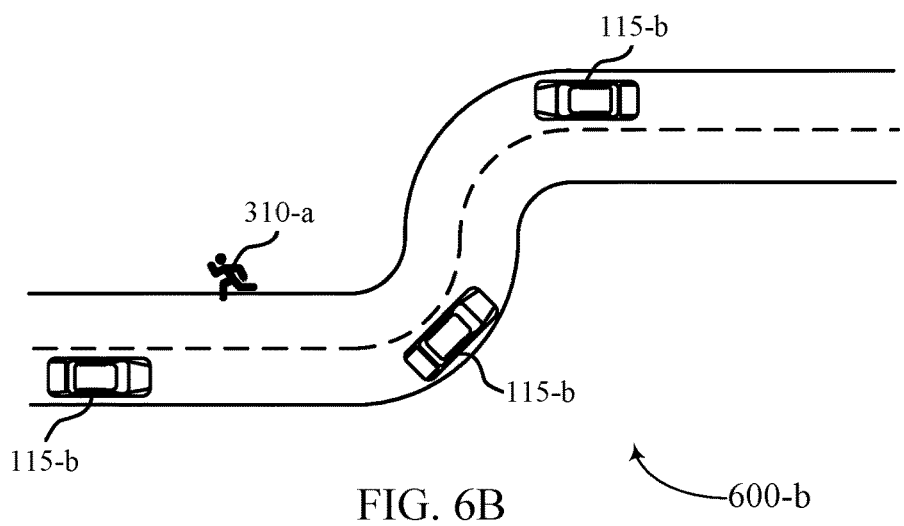
Figure 6C:
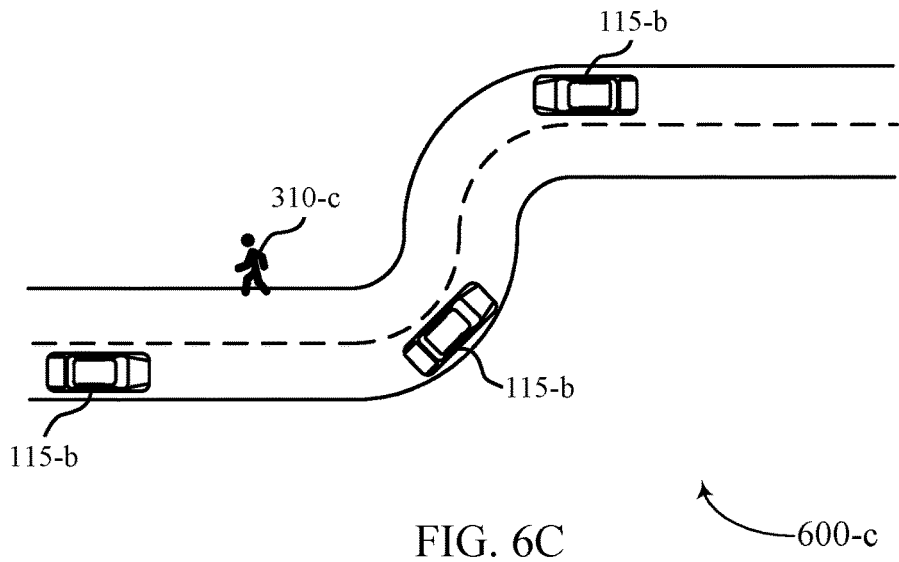

FIGS. 6A, 6B, and 6C illustrate examples of V2X environments 600 that support environment-dependent safety messaging in accordance with aspects of the present disclosure. The V2X environments 600 may implement aspects of the wireless communications systems 100 and 200. For example, the V2X environments 600 may include UEs 115-*b*, which may be examples of a corresponding UE 115-*b* as described with reference to FIG. 2 and a corresponding UE 115 as described with reference to FIG. 1. FIGS. 6A, 6B, and 6C may include UEs 115-b, which may be examples of vehicles. The V2X environments 600 may additionally include VRUs 310. For example, the VRU 310-a may be an example of a runner, the VRU 310-b may be an example of a cyclist, and the VRU 310-c may be an example of a walker or a pedestrian (e.g., a stationary pedestrian) within a vicinity of a road. As described herein, VRUs 310 may be associated with UEs 115, such as cellular phones or other wireless devices, which are not shown. For example, VRUs 310 may carry UEs 115. As described herein, the term "UE 115" may be used to describe vehicles (e.g., the UEs 115-b), cellular phones (not shown) associated with VRUs 310 or other types of UEs 115.

A UE 115 (e.g., a wireless device) carried by or otherwise associated with a VRU 310 may detect an activity associated with the VRU 310. For example, a VRU 310 may perform one or more activities such as cycling, running, jogging, walking. Additionally or alternatively, the VRU 310 may refrain from performing an activity. The UE 115 may determine one or more activities performed by the VRU 310 based on at least one of accelerometer data, input from a paired wearable device (e.g., a fitness tracker), and stored historical information (e.g., a route for an activity such as an exercise routine performed periodically). In some cases, the UE 115 may select a periodicity for safety message transmissions based on the activity associated with the corresponding VRU 310. In some cases, an activity type may be associated with a reduced ability of the VRU 310 to focus on the road and potential safety hazards.

FIG. 6A may illustrate a V2X environment 600-a corresponding to the VRU 310-b performing a first activity such as cycling. In some cases, a UE 115 carried by the VRU 310-b may detect the first activity performed by the VRU 310-b. For example, the UE 115 may detect that the VRU 310-b is cycling. The UE 115 may detect that the VRU 310-b is performing the first activity based on at least one of accelerometer data, input from a paired wearable, and stored historical information. In some cases, the UE 115 may determine to increase a periodicity of safety message transmissions based on determining that the VRU 310-b is performing the first activity.

FIG. 6B may illustrate a V2X environment 600-b corresponding to the VRU 310-a performing a second activity such as running or jogging. In some cases, a UE 115 carried by the VRU 310-a may detect the second activity performed by the VRU 310-a. For example, the UE 115 may detect that the VRU 310-a is running or jogging. The UE 115 may detect that the VRU 310-a is performing the second activity based on at least one of accelerometer data, input from a paired wearable, and stored historical information. In some cases, the UE 115 may determine to increase a periodicity of safety message transmissions based on determining that the VRU 310-a is performing the second activity.

FIG. 6C may illustrate a V2X environment 600-c corresponding to the VRU 310-c performing a third activity such as walking. In some cases, a UE 115 carried by the VRU 310-c may detect the third activity performed by the VRU 310-c. For example, the UE 115 may detect that the VRU 310-c walking. The UE 115 may detect that the VRU 310-c is performing the third activity based on at least one of accelerometer data, input from a paired wearable, and stored historical information. In some cases, the UE 115 may determine to decrease a periodicity of safety message transmissions based on determining that the VRU 310-c is performing the third activity.

Figure 7A:
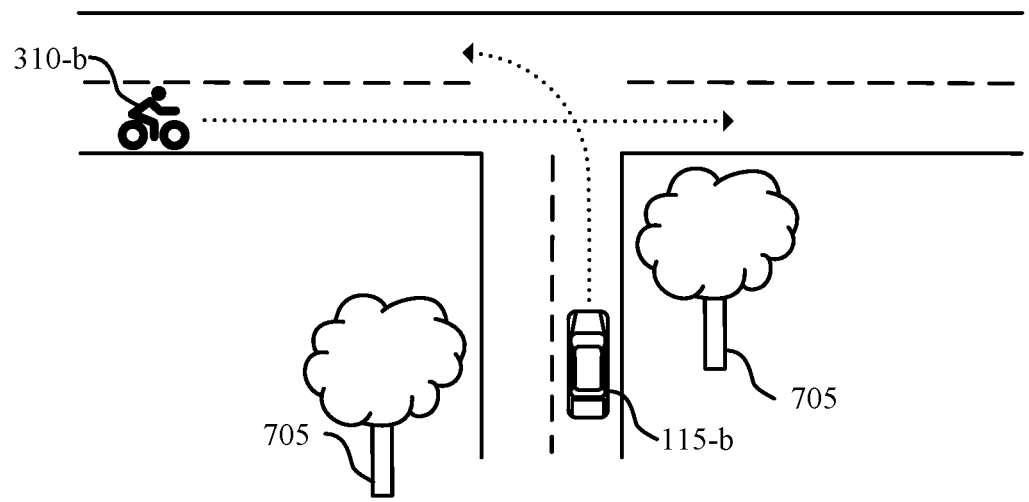
FIGS. 7A and 7B illustrate examples of V2X environments that support environment-dependent safety messaging in accordance with aspects of the present disclosure.
Figure 7B:
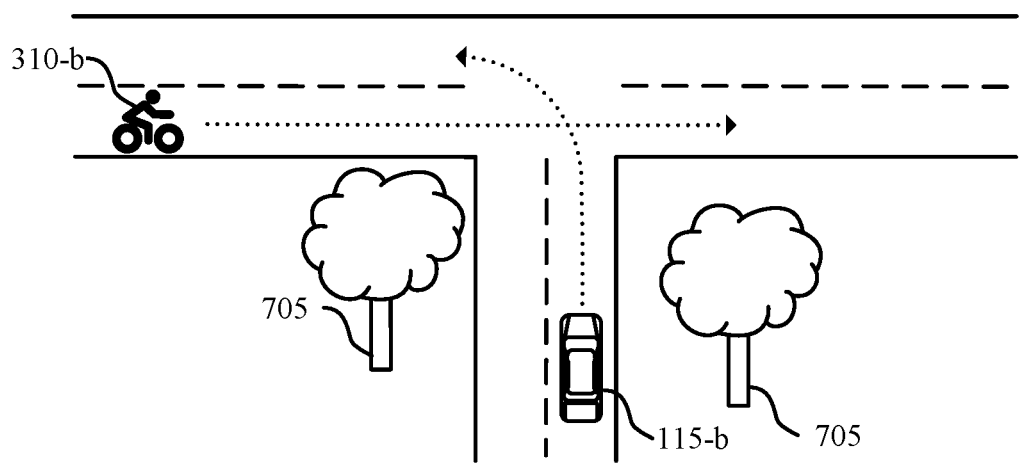

FIGS. 7A and 7B illustrate examples of V2X environments 700 that support environment-dependent safety messaging in accordance with aspects of the present disclosure. The V2X environments 700 may implement aspects of the wireless communications systems 100 and 200. For example, the V2X environments 700 may include UEs 115-b, which may be examples of a corresponding UE 115-b as described with reference to FIG. 2 and a corresponding UE 115 as described with reference to FIG. 1. FIGS. 7A and 7B may include UEs 115-b, which may be examples of vehicles. The V2X environments 700 may additionally include VRUs 310. As described herein, VRUs 310 may be associated with UEs 115, such as cellular phones or other wireless devices, which are not shown. For example, VRUs 310 may carry UEs 115. As described herein, the term "UE 115" may be used to describe vehicles (e.g., the UEs 115-b), cellular phones (not shown) associated with VRUs 310 or other types of UEs 115. The V2X environments 700 may additionally include obstructions 705, such as trees, buildings, or other objects that may impede a line of sight between a vehicle (e.g., a UE 115-b) and a VRU 310.

A UE 115 (e.g., a wireless device) carried by or otherwise associated with a VRU 310 may determine one or more visibility conditions. For example, a UE 115 may be located in an urban environment where buildings obstruct a line-of-sight view around corners. Similarly, a UE 115 may be located in an environment where other objects obstruct a line-of-sight view around corners, or otherwise obstruct a view between the UE 115 and UEs 115-b. As described herein, the V2X environments 700 may include obstructions 705, which may be examples of trees, or any other type of obstruction, such as buildings, other landscaping or building features, or topology (e.g., hills). In some cases, the UE 115 may detect one or more visibility conditions based on activating one or more video components. For example, the UE 115 may activate a camera, which may detect one or more obstructions 705. Additionally or alternatively, the UE 115 may determine a position or presence of one or more obstructions 705 based on stored, accessed or downloaded map information (e.g., information from Google Maps, information from Apple Maps). In some cases, the UE 115 may implicitly determine the presence of one or more obstructions 705 based on road topology or neighborhood type associated with map information. For example, the UE 115 may implicitly determine that obstructions 705 (e.g., buildings) are located near intersections based on a location of the UE 115 within an urban neighborhood type.

FIG. 7A may illustrate a V2X environment 700-a corresponding to an unobstructed line of sight between a VRU 310-b and a UE 115-b. For example, a line of sight between the VRU 310-b and the UE 115-b may not be blocked by an obstruction 705. The VRU 310-b may approach an intersection and the UE 115 associated with the VRU 310-b may detect the presence of the UE 115-b. For example, the UE 115 and the UE 115-b may successfully receive safety messages as a result of the lack of obstructions 705 impeding a line of sight path between the UE 115 and the UE 115-b. Accordingly, the UE 115 may determine a visibility condition (e.g., unobstructed visibility) and may select a periodicity for safety message transmissions based on determining that the visibility condition is unobstructed. For example, the UE 115 may determine to decrease a periodicity of safety message transmissions based on determining that the visibility condition is unobstructed.

FIG. 7B may illustrate a V2X environment 700-b corresponding to an unobstructed line of sight between a VRU 310-b and a UE 115-b. For example, a line of sight between the VRU 310-*b* and the UE 115-*b* may not be blocked by an obstruction 705. The VRU 310-*b* may approach an intersection and the UE 115 associated with the VRU 310-*b* may detect the presence of the UE 115-*b*. For example, the UE 115 and the UE 115-*b* may successfully receive safety messages as a result of the lack of obstructions 705 impeding a line of sight path between the UE 115 and the UE 115-*b*. Accordingly, the UE 115 may determine a visibility condition (e.g., unobstructed visibility) and may select a periodicity for safety message transmissions based on determining that the visibility condition is unobstructed. For example, the UE 115 may determine to decrease a periodicity of safety message transmissions based on determining that the visibility condition is unobstructed.

Figure 8A:
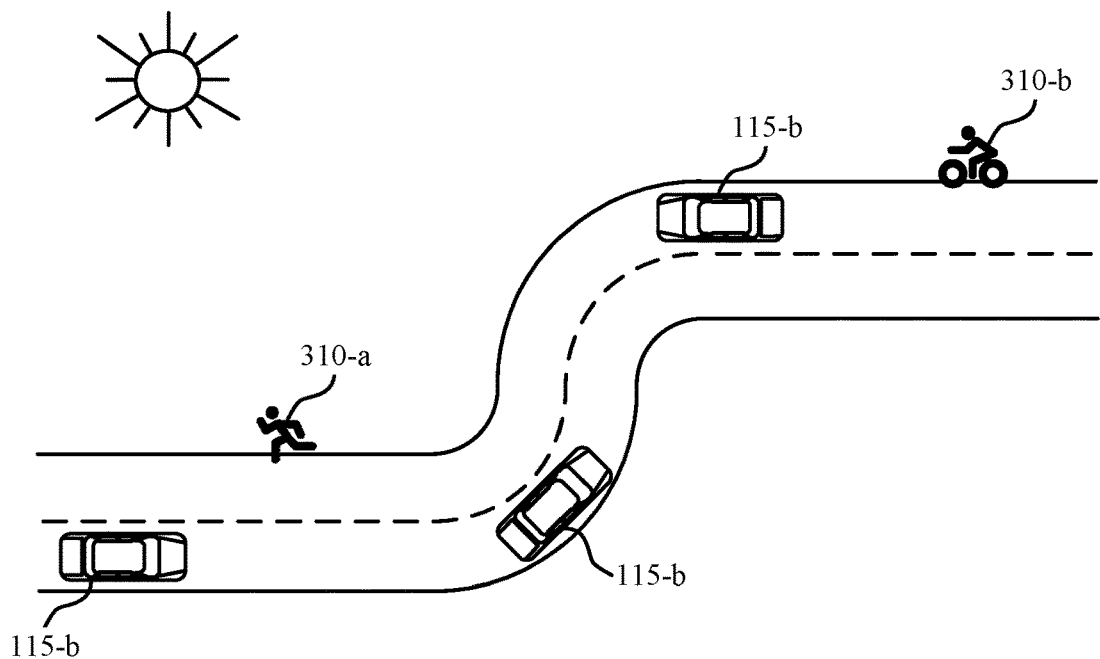
FIGS. 8A and 8B illustrate examples of V2X environments that support environment-dependent safety messaging in accordance with aspects of the present disclosure.
Figure 8B:
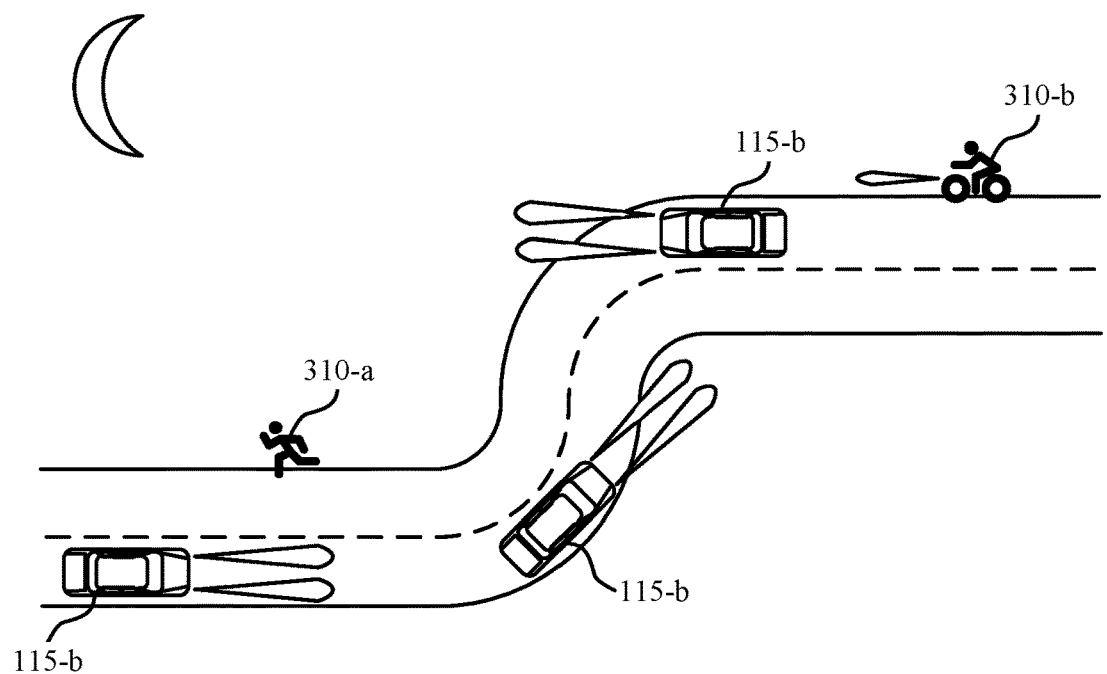

FIGS. 8A and 8B illustrate examples of V2X environments 800 that support environment-dependent safety messaging in accordance with aspects of the present disclosure. The V2X environments 800 may implement aspects of the wireless communications systems 100 and 200. For example, the V2X environments 800 may include UEs 115-*b*, which may be examples of a corresponding UE 115-*b* as described with reference to FIG. 2 and a corresponding UE 115 as described with reference to FIG. 1. FIGS. 8A and 8B may include UEs 115-*b*, which may be examples of vehicles. The V2X environments 800 may additionally include VRUs 310. As described herein, VRUs 310 may be associated with UEs 115, such as cellular phones or other wireless devices, which are not shown. For example, VRUs 310 may carry UEs 115. As described herein, the term "UE 115" may be used to describe vehicles (e.g., the UEs 115-*b*), cellular phones (not shown) associated with VRUs 310 or other types of UEs 115.

A UE 115 (e.g., a wireless device) carried by or otherwise associated with a VRU 310 may determine one or more visibility conditions. For example, the UE 115 may determine a time of day, which may be associated with one or more visibility conditions. Additionally or alternatively, the UE 115 may determine one or more visibility conditions associated with weather conditions or lighting conditions. For example, the UE 115 may determine that visibility conditions are poor based on the presence of rain, snow, fog, pollution, or other weather conditions. In some other cases, the UE 115 may determine visibility conditions based on a location of the UE 115 or sensor detection. For example, the UE 115 may be located within a tunnel, or may be located within a canyon, and low-light conditions may reduce the ability of the VRU 310 to detect potential safety hazards. In some cases, the UE 115 may detect one or more visibility conditions based on activating one or more video components. For example, the UE 115 may activate a camera, which may detect one or more lighting conditions, such as high or low lighting. Additionally or alternatively, the UE 115 may determine a time of day based on stored, accessed or downloaded timing information. In some cases, the UE 115 may further determine visibility conditions based on the time of day. For example, the UE may determine that visibility conditions are poor during dawn, dusk, and nighttime.

FIG. 8A may illustrate a V2X environment 800-*a* corresponding to high visibility conditions. For example, the V2X environment 800-*a* may correspond to daytime. Accordingly, the VRUs 310 may experience high visibility conditions. For example, a line of sight between the VRUs 310 and the UEs 115-*b* may be unobstructed. Additionally or alternatively, weather conditions may not obstruct visibility for the VRUs 310. As a result, the VRUs 310 may be able to effectively detect potential safety hazards. For example, the VRUs 310 may be able to effectively detect the presence of UEs 115-*b*, which may pose safety risks for the VRUs 310. In some cases, a UE 115 associated with a VRU 310 may select a periodicity for safety message transmissions based on determining that high visibility conditions exist. For example, the UE 115 may determine to decrease a periodicity of safety message transmissions based on determining that the high visibility conditions exist.

FIG. 8B may illustrate a V2X environment 800-*b* corresponding to low visibility conditions. For example, the V2X environment 800-*a* may correspond to nighttime, dawn, or dusk. Accordingly, the VRUs 310 may experience low visibility conditions. For example, a line of sight between the VRUs 310 and the UEs 115-*b* may be obstructed. Additionally or alternatively, weather conditions (e.g., rain, snow, fog, pollution) may obstruct visibility for the VRUs 310. As a result, the VRUs 310 may not be able to effectively detect potential safety hazards. For example, the VRUs 310 may not be able to effectively detect the presence of UEs 115-*b*, which may pose safety risks for the VRUs 310. In some cases, a UE 115 associated with a VRU 310 may select a periodicity for safety message transmissions based on determining that low visibility conditions exist. For example, the UE 115 may determine to increase a periodicity of safety message transmissions based on determining that the high visibility conditions exist.

Figure 9:
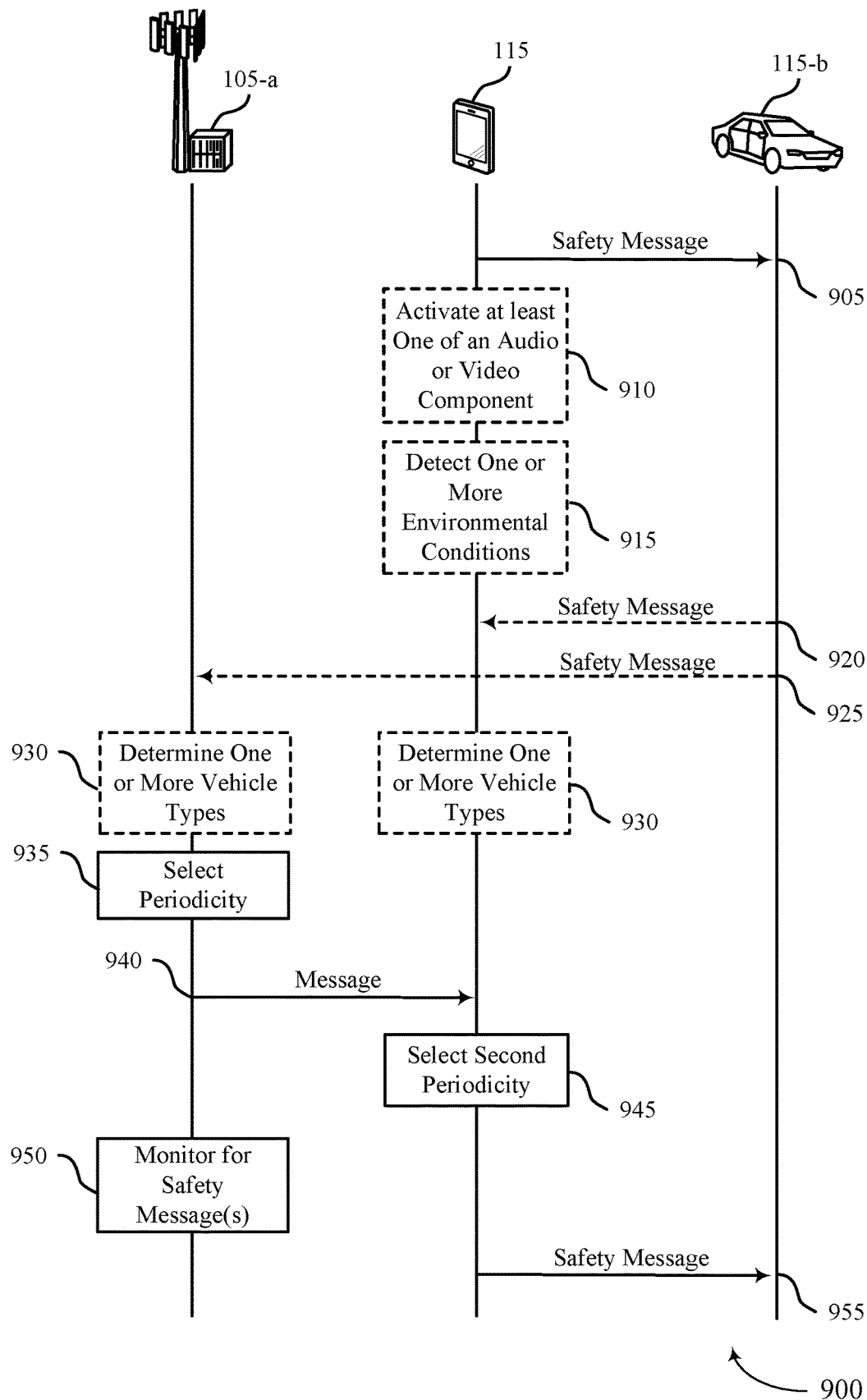
FIG. 9 illustrates an example of a process flow that supports environment-dependent safety messaging in accordance with aspects of the present disclosure.

FIG. 9 illustrates an example of a process flow 900 that supports environment-dependent safety messaging in accordance with aspects of the present disclosure. In some examples, process flow 900 may implement aspects of the wireless communications systems 100 and 200. For example, process flow 900 may include UE 115, which may be examples of corresponding UEs as described with reference to FIGS. 1 and 2. Process flow 900 may also include base station 105, which may be an example of corresponding base stations 105 as described with reference to FIGS. 1 and 2.

In the following description of process flow 900, the operations between the UE 115 and the base station 105 may be transmitted in a different order than the order shown, or the operations may be performed at different times. Some operations may also be left out of process flow 900, or other operations may be added to process flow 900. While UE 115 is shown performing a number of the operations of process flow 900, any wireless device may perform the operations shown. For example, base station 105 may perform the operations shown.

At 905, the UE 115 may transmit a first safety message associated with the UE 115. The first safety message may be transmitted according to a first periodicity of a set of transmission periodicities for safety message transmissions. The first safety message may include a PSM, a VAM, or an application-layer message, and the second safety message may include a PSM, a VAM, or an application-layer message.

At 910, the UE 115 may activate at least one of an audio component or a video component of the UE 115. For example, the UE 115 may activate a camera or a microphone. In some cases, the UE 115 may detect one or more environmental conditions based on activating the audio component or the video component. For example, the UE 115 may detect one or more visibility conditions based on activating a camera. Similarly, the UE 115 may detect a quantity of nearby vehicles (e.g., UEs 115-*b*) based on activating a microphone.

At 915, the UE 115 may detect the one or more environmental conditions based on activating at least one of the audio component or the video component of the UE. In some cases, detecting the one or more environmental conditions may include detecting a topology, a neighborhood type, a presence of one or more obstructions, a presence of a shoulder, a presence of a sidewalk, a quantity of vehicles, a visibility condition, or a combination thereof At 920, the UE 115 may receive one or more safety messages from one or more other UEs 115 (e.g., the UE 115-b). In some cases, the second periodicity is selected from the set of transmission periodicities based on a quantity of the one or more safety messages relative to a threshold quantity. The one or more safety messages may include one or more BSM, one or more PSM, one or more VAM, one or more CAM, one or more DENM, one or more sensor sharing messages, one or more cooperative perception messages, one or more maneuver coordination messages, one or more application-layer messages, or any combination thereof.

At 925, the base station 105-a may receive one or more safety messages from one or more other UEs 115 (e.g., the UE 115-b). The periodicity is selected from the set of transmission periodicities based on a quantity of the one or more safety messages relative to a threshold quantity. The one or more safety messages may include one or more BSM, one or more PSM, one or more VAM, one or more CAM, one or more DENM, one or more application-layer messages, one or more sensor sharing messages, one or more cooperative perception messages, one or more maneuver coordination messages, or any combination thereof At 930, the UE 115 may determine one or more vehicle types associated with the one or more safety messages, where the second periodicity is selected based on the one or more vehicle types. Additionally or alternatively, the base station 105-a may determine one or more vehicle types associated with the one or more safety messages, where the second periodicity is selected based on the one or more vehicle types.

At 935, the base station 105-a may select a periodicity of a set of transmission periodicities for safety message transmissions for the UE 115 based on one or more environmental conditions associated with the UE 115. In some cases, the one or more environmental conditions may include topological information where selecting the periodicity includes selecting the periodicity based on the topological information. The topological information may correspond to a location of the UE 115 and may indicate a neighborhood type associated with the location of the UE 115, a presence of one or more potential obstructions between the UE 115 and other UEs 115 (e.g., UEs 115-b), geographical information associated with the location of the UE 115, or a combination thereof.

The one or more environmental conditions may include road information, where selecting the periodicity includes selecting the periodicity based on the road information. The road information may indicate a road topology, a presence of a sidewalk, a presence of a shoulder, a presence of a bicycle lane, a presence of a median, one or more intersections, a number of lanes, a presence of one or more turning lanes, one or more lane widths, or a combination thereof.

In some cases, the one or more environmental conditions may include visibility information, where selecting the periodicity may include selecting the periodicity based on the visibility information. The visibility information may correspond to a weather condition associated with a location of the UE 115, a time of day associated with the UE 115, or a combination thereof. In some cases, selecting the periodicity may include selecting the periodicity based on a parameter associated with the UE 115, where the parameter includes a speed of the UE 115, an acceleration of the UE 115, an activity of the UE 115, historical information associated with the UE 115, or a combination thereof. In some cases, selecting the periodicity may include selecting the periodicity greater than a first periodicity based on the quantity of the one or more safety messages being greater than the threshold quantity or selecting the periodicity less than the first periodicity based on the quantity of the one or more safety messages being less than the threshold quantity.

At 940, the base station 105-a may transmit, to the UE 115, a message comprising an indication of the periodicity. For example, the base station 105-a may transmit control signaling to the UE 115. The control signaling may include an indication of the periodicity. The base station may transmit the control signaling based on selecting the periodicity.

At 945, the UE 115 may select a second periodicity of the set of transmission periodicities based on one or more environmental conditions associated with the UE 115. The one or more environmental conditions may include topological information. In some cases, the UE 115 may select the second periodicity based on the topological information. The topological information may correspond to a location of the UE 115 and may indicate a neighborhood type associated with the location of the UE 115, a presence of one or more potential obstructions between the UE 115 and other UEs 115-b, geographical information associated with the location of the UE 115, or a combination thereof.

In some cases, the one or more environmental conditions may include road information, where selecting the second periodicity may include selecting the second periodicity based on the road information. The road information may indicate a road topology, a presence of a sidewalk, a presence of a shoulder, a presence of a bicycle lane, a presence of a median, one or more intersections, a number of lanes, a presence of one or more turning lanes, one or more lane widths, or a combination thereof. The one or more environmental conditions may include visibility information, where selecting the second periodicity includes selecting the second periodicity based on the visibility information. In some cases, the visibility information corresponds to a weather condition associated with a location of the UE 115, a time of day associated with the UE 115, or a combination thereof.

In some cases, selecting the second periodicity includes selecting the second periodicity based on a parameter associated with the UE 115, where the parameter includes a speed of the UE 115, an acceleration of the UE 115, an activity of the UE 115, historical information associated with the UE 115, or a combination thereof. In some cases, the UE 115 may select the second periodicity greater than the first periodicity based on the quantity of the one or more safety messages being greater than the threshold quantity. Alternatively, the UE 115 may select the second periodicity less than the first periodicity based on the quantity of the one or more safety messages being less than the threshold quantity.

At 950, the base station 105-a may monitor for at least one safety message from the UE 115 according to the periodicity and based on the indication of the periodicity. The at least one safety message may include a PSM, a VAM, or an application-layer message. The one or more safety messages may include one or more BSMs, one or more PSMs, one or more VAMs, one or more CAMs, one or more DENMs, one or more application-layer messages, one or more sensor sharing messages, one or more cooperative perception messages, one or more maneuver coordination messages, or any combination thereof.

At 955, the UE 115 may transmit a second safety message associated with the UE 115 according to the second periodicity of the set of transmission periodicities based on selecting the second periodicity. In some cases, the UE 115 may broadcast, multicast, or groupcast the second safety message. The UE 115-*b* may receive the second safety message and may determine to perform one or more actions based on receiving the second safety message. For example, the UE 115-*b* may perform one or more actions that improve safety associated with the UE 115 and the UE 115-*b*.

Figure 10:
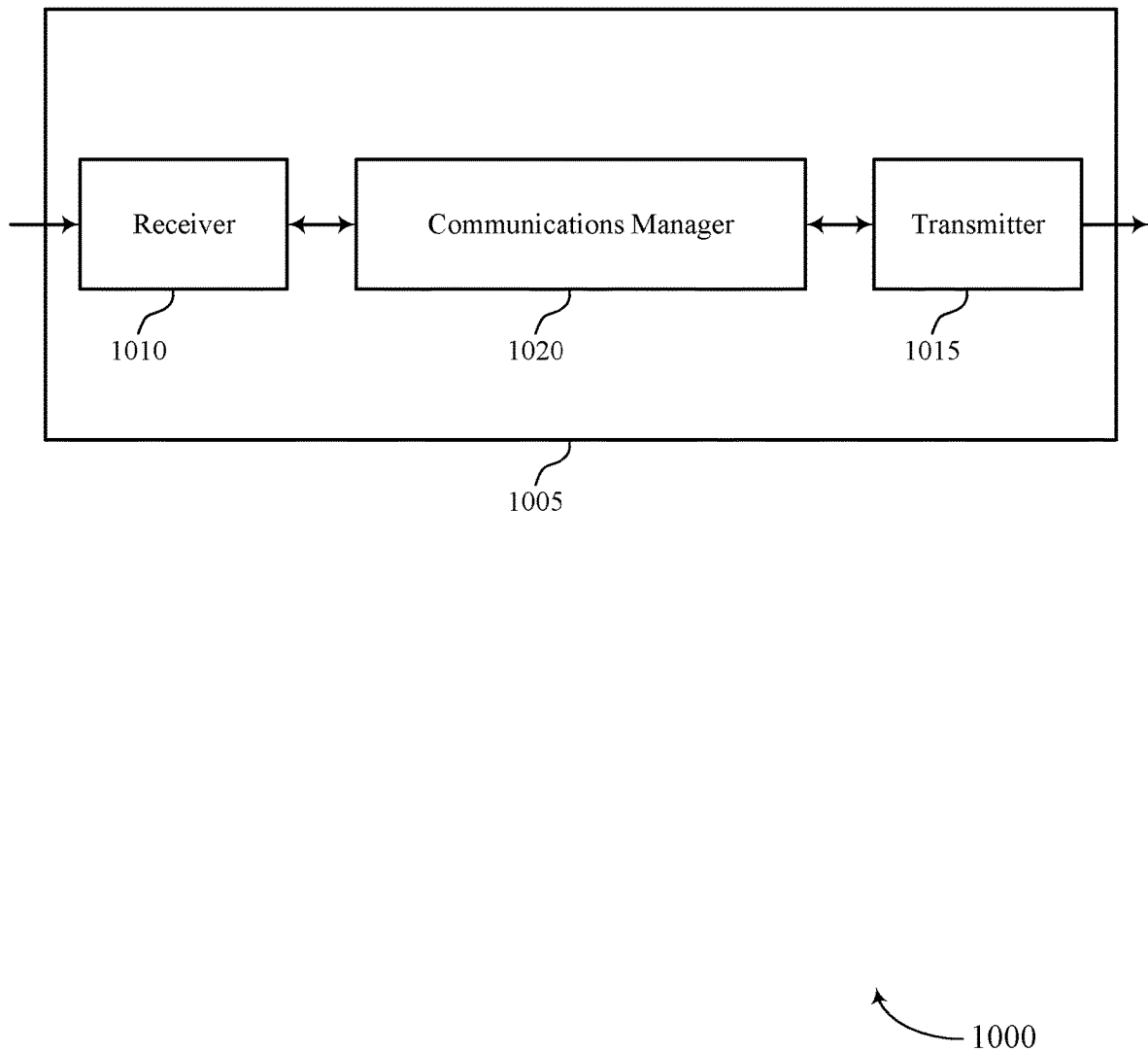
FIGS. 10 and 11 show block diagrams of devices that support environment-dependent safety messaging in accordance with aspects of the present disclosure.

FIG. 10 shows a block diagram 1000 of a device 1005 that supports environment-dependent safety messaging in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to environment-dependent safety messaging). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to environment-dependent safety messaging). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of environment-dependent safety messaging as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for transmitting a first safety message associated with the UE, the first safety message transmitted according to a first periodicity of a set of transmission periodicities for safety message transmissions. The communications manager 1020 may be configured as or otherwise support a means for selecting a second periodicity of the set of transmission periodicities based on one or more environmental conditions associated with the UE. The communications manager 1020 may be configured as or otherwise support a means for transmitting a second safety message associated with the UE according to the second periodicity of the set of transmission periodicities based on selecting the second periodicity.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption, more efficient utilization of communication resources, and improved coordination between devices. For example, the device 1005 may support reduced power consumption associated with reduced or optimized safety message transmission periodicities. The techniques for reduced power consumption may allow the device 1005 to reduce the processing overhead at the device 1005 and more efficiently perform safety message signaling. In some cases, the device 1005 may reduce a periodicity for safety message transmissions based on one or more environmental conditions, one or more parameters associated with the device 1005, which may reduce processing overhead at the device 1005 and reduce battery power utilization associated with the processing overhead.

Figure 11:
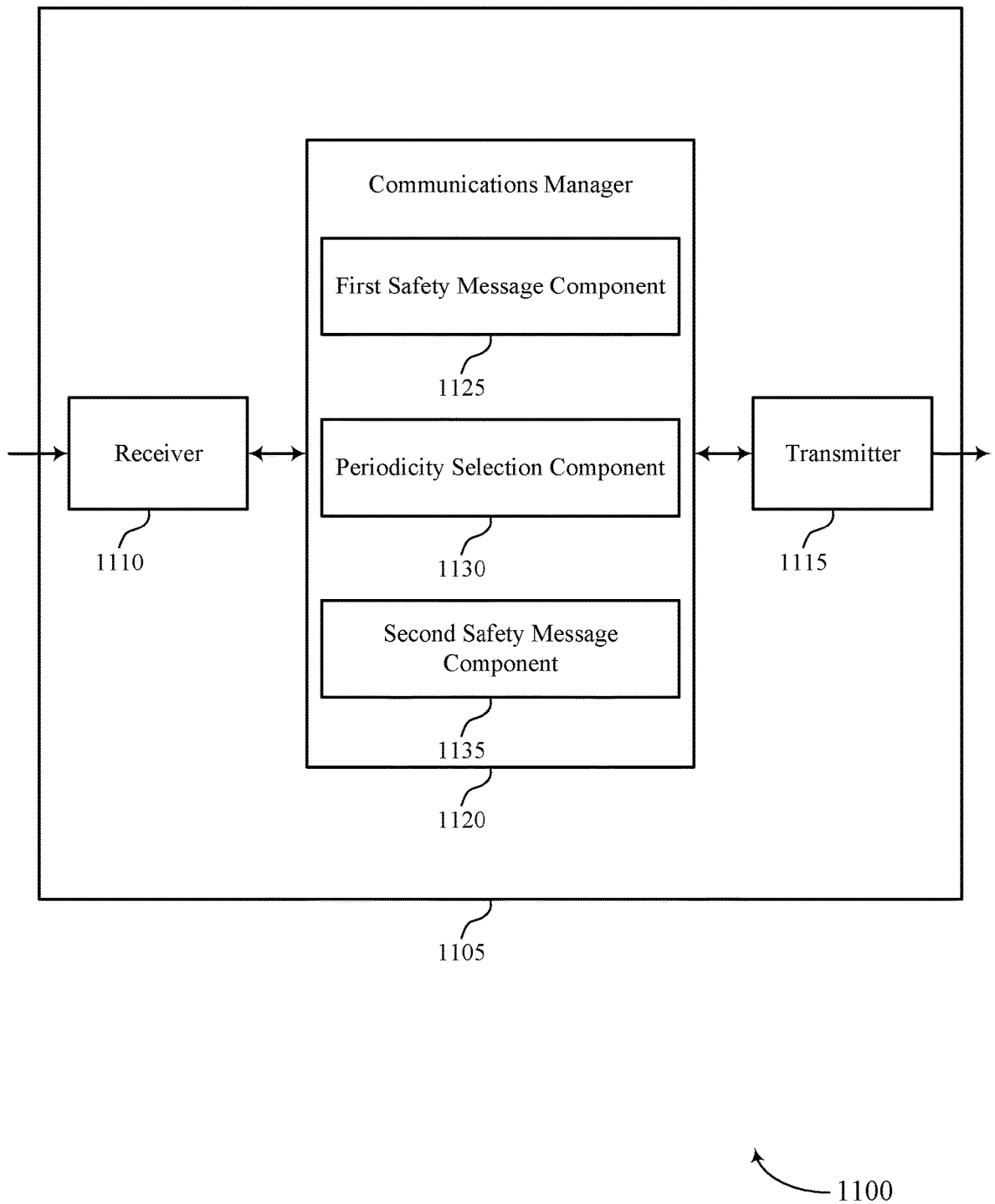

FIG. 11 shows a block diagram 1100 of a device 1105 that supports environment-dependent safety messaging in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to environment-dependent safety messaging). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to environment-dependent safety messaging). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of environment-dependent safety messaging as described herein. For example, the communications manager 1120 may include a first safety message component 1125, a periodicity selection component 1130, a second safety message component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The first safety message component 1125 may be configured as or otherwise support a means for transmitting a first safety message associated with the UE, the first safety message transmitted according to a first periodicity of a set of transmission periodicities for safety message transmissions. The periodicity selection component 1130 may be configured as or otherwise support a means for selecting a second periodicity of the set of transmission periodicities based on one or more environmental conditions associated with the UE. The second safety message component 1135 may be configured as or otherwise support a means for transmitting a second safety message associated with the UE according to the second periodicity of the set of transmission periodicities based on selecting the second periodicity.

Figure 12:
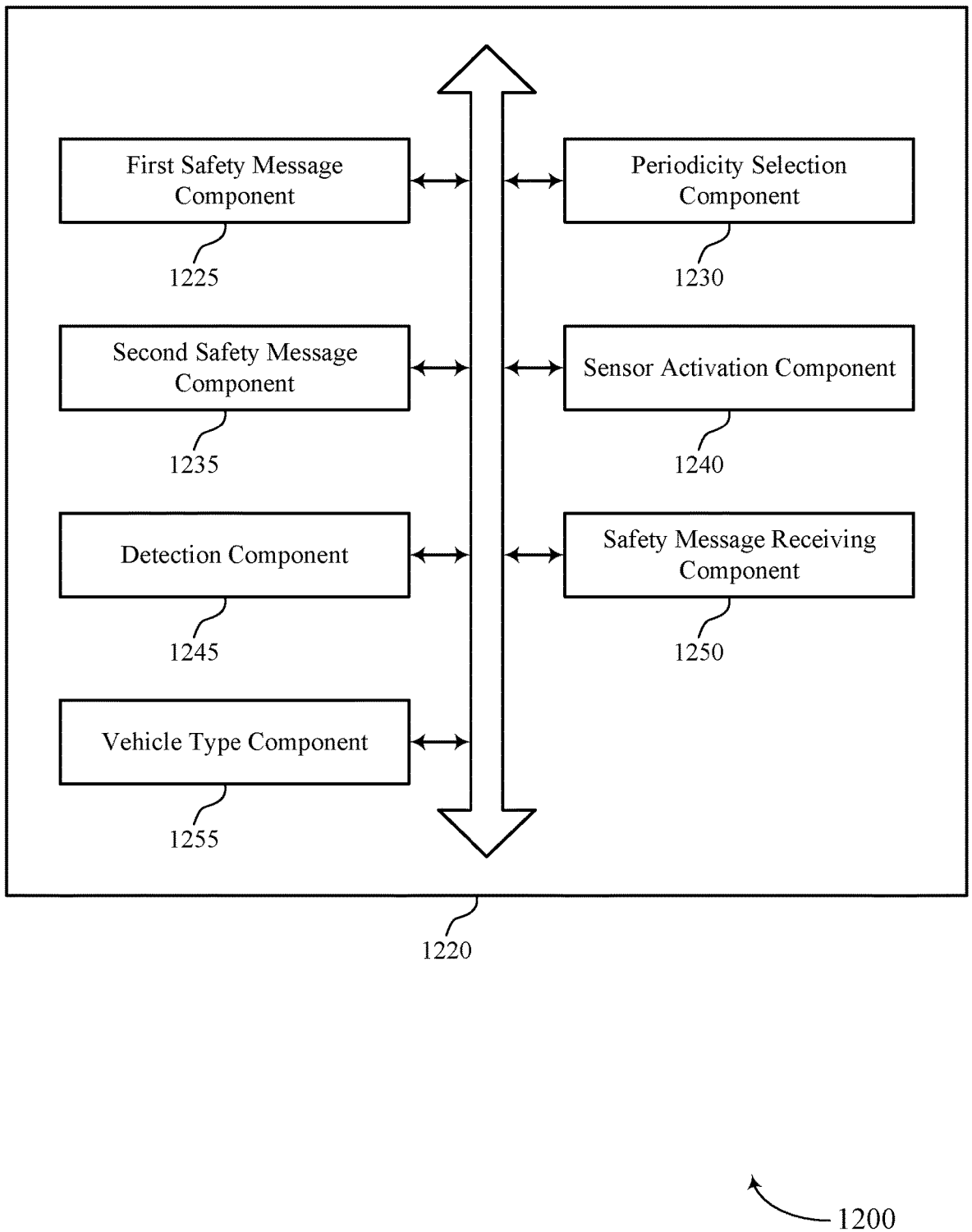
FIG. 12 shows a block diagram of a communications manager that supports environment-dependent safety messaging in accordance with aspects of the present disclosure.

FIG. 12 shows a block diagram 1200 of a communications manager 1220 that supports environment-dependent safety messaging in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of environment-dependent safety messaging as described herein. For example, the communications manager 1220 may include a first safety message component 1225, a periodicity selection component 1230, a second safety message component 1235, a sensor activation component 1240, a detection component 1245, a safety message receiving component 1250, a vehicle type component 1255, or any combination thereof. Each of these components may communicate, directly or indirectly, with one another (e.g., via one or more buses).

The communications manager 1220 may support wireless communications at a UE in accordance with examples as disclosed herein. The first safety message component 1225 may be configured as or otherwise support a means for transmitting a first safety message associated with the UE, the first safety message transmitted according to a first periodicity of a set of transmission periodicities for safety message transmissions. The periodicity selection component 1230 may be configured as or otherwise support a means for selecting a second periodicity of the set of transmission periodicities based on one or more environmental conditions associated with the UE. The second safety message component 1235 may be configured as or otherwise support a means for transmitting a second safety message associated with the UE according to the second periodicity of the set of transmission periodicities based on selecting the second periodicity.

In some examples, to support selecting the second periodicity, the periodicity selection component 1230 may be configured as or otherwise support a means for selecting the second periodicity based on the topological information, where the topological information corresponds to a location of the UE and indicates a neighborhood type associated with the location of the UE, a presence of one or more potential obstructions between the UE and other UEs, geographical information associated with the location of the UE, or a combination thereof.

In some examples, to support selecting the second periodicity, the periodicity selection component 1230 may be configured as or otherwise support a means for selecting the second periodicity based on the road information, where the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

In some examples, to support selecting the second periodicity, the periodicity selection component 1230 may be configured as or otherwise support a means for selecting the second periodicity based on the visibility information, where the visibility information corresponds to a weather condition associated with a location of the UE, a time of day associated with the UE, or a combination thereof.

In some examples, to support selecting the second periodicity, the periodicity selection component 1230 may be configured as or otherwise support a means for selecting the second periodicity based on a parameter associated with the UE, where the parameter includes a speed of the UE, an acceleration of the UE, an activity of the UE, historical information associated with the UE, or a combination thereof.

In some examples, the sensor activation component 1240 may be configured as or otherwise support a means for activating at least one of an audio component or a video component of the UE. In some examples, the detection component 1245 may be configured as or otherwise support a means for detecting the one or more environmental conditions based on activating at least one of the audio component or the video component of the UE.

In some examples, to support detecting the one or more environmental conditions, the detection component 1245 may be configured as or otherwise support a means for detecting a topology, a neighborhood type, a presence of one or more obstructions, a presence of a shoulder, a presence of a sidewalk, a quantity of vehicles, a visibility condition, or a combination thereof.

In some examples, the first safety message includes a personal safety message, a vulnerable road user awareness message, or an application-layer message, and the second safety message includes a personal safety message, a vulnerable road user awareness message, or an application-layer message.

In some examples, the safety message receiving component 1250 may be configured as or otherwise support a means for receiving one or more safety messages from one or more other UEs, where the second periodicity is selected from the set of transmission periodicities based on a quantity of the one or more safety messages relative to a threshold quantity.

In some examples, the vehicle type component 1255 may be configured as or otherwise support a means for determining one or more vehicle types associated with the one or more safety messages, where the second periodicity is selected based on the one or more vehicle types.

In some examples, to support selecting the second periodicity, the safety message receiving component 1250 may be configured as or otherwise support a means for selecting the second periodicity greater than the first periodicity based on the quantity of the one or more safety messages being greater than the threshold quantity or selecting the second periodicity less than the first periodicity based on the quantity of the one or more safety messages being less than the threshold quantity.

In some examples, the one or more safety messages includes one or more basic safety messages, one or more personal safety messages, one or more vulnerable road user awareness messages, one or more co-operative awareness messages, one or more decentralized environmental notification messages, one or more application-layer messages, one or more sensor sharing messages, one or more cooperative perception messages, one or more maneuver coordination messages, or any combination thereof.

Figure 13:
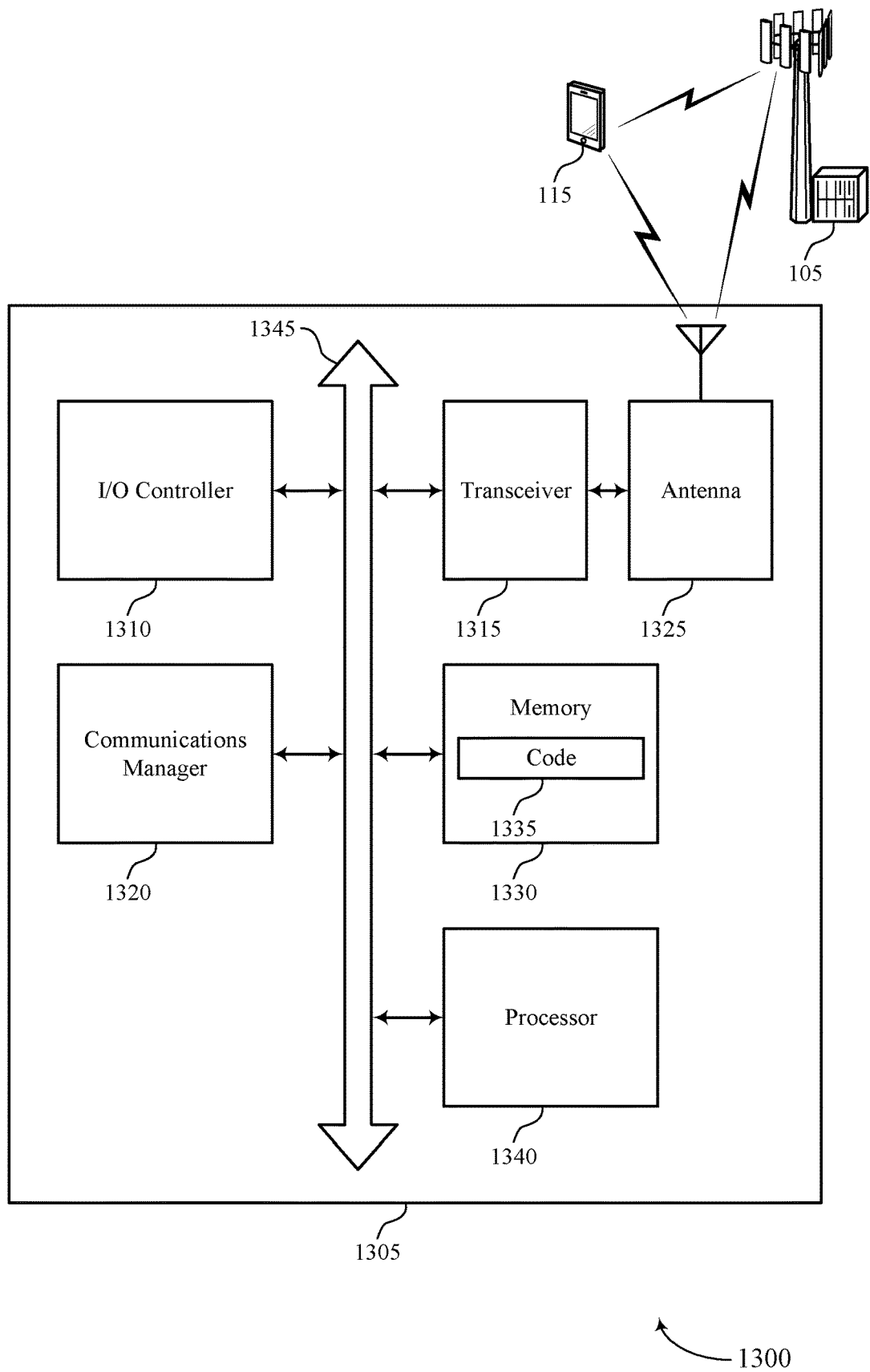
FIG. 13 shows a diagram of a system including a device that supports environment-dependent safety messaging in accordance with aspects of the present disclosure.

FIG. 13 shows a diagram of a system 1300 including a device 1305 that supports environment-dependent safety messaging in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting environment-dependent safety messaging). For example, the device 1305 or a component of the device 1305 may include a processor 1340 and memory 1330 coupled with the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for transmitting a first safety message associated with the UE, the first safety message transmitted according to a first periodicity of a set of transmission periodicities for safety message transmissions. The communications manager 1320 may be configured as or otherwise support a means for selecting a second periodicity of the set of transmission periodicities based on one or more environmental conditions associated with the UE. The communications manager 1320 may be configured as or otherwise support a means for transmitting a second safety message associated with the UE according to the second periodicity of the set of transmission periodicities based on selecting the second periodicity.

By including or configuring the communications manager 1320 in accordance with examples as described herein, the device 1305 may support techniques for reduced latency, reduced power consumption, more efficient utilization of communication resources, and improved coordination between devices. For example, the device 1305 may support reduced latency associated with reduced or optimized safety message transmission periodicities. In some cases, the device 1305 may increase a periodicity of safety message transmissions, which may decrease latency associated with receiving and processing the transmissions. In some other cases, the device 1305 may decrease a periodicity of safety message transmissions, which may reduce power consumption and may allow the device 1305 to more efficiently perform safety message signaling. In some cases, the device 1305 may select a periodicity for safety message transmissions based on one or more environmental conditions, one or more parameters associated with the device 1305, which may increase user safety.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of environment-dependent safety messaging as described herein, or the processor 1340 and the memory 1330 may be otherwise configured to perform or support such operations.

Figure 14:
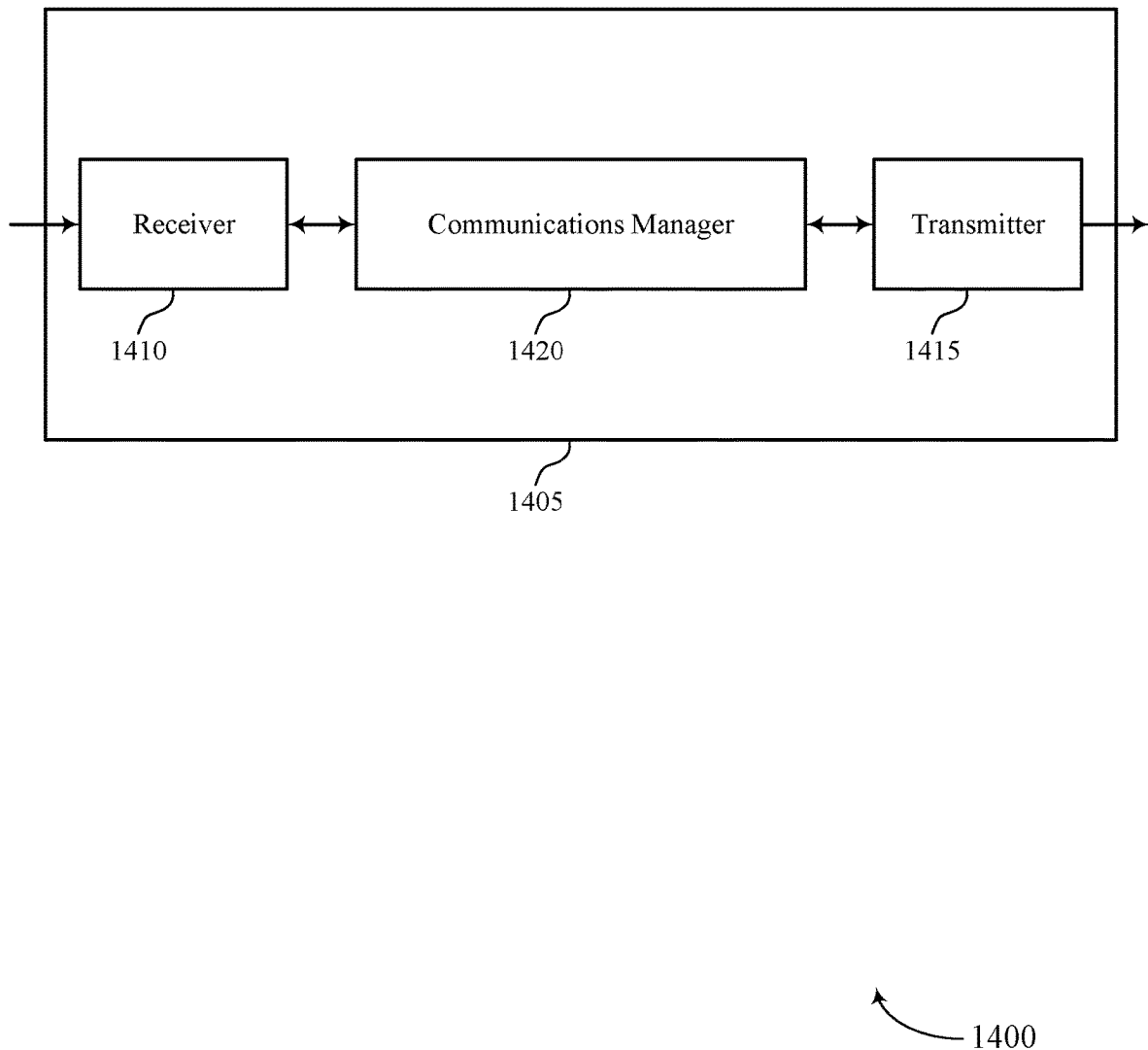
FIGS. 14 and 15 show block diagrams of devices that support environment-dependent safety messaging in accordance with aspects of the present disclosure.

FIG. 14 shows a block diagram 1400 of a device 1405 that supports environment-dependent safety messaging in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to environment-dependent safety messaging). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to environment-dependent safety messaging). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of environment-dependent safety messaging as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. For example, the communications manager 1420 may be configured as or otherwise support a means for selecting a periodicity of a set of transmission periodicities for safety message transmissions for a UE based on one or more environmental conditions associated with the UE. The communications manager 1420 may be configured as or otherwise support a means for transmitting, to the UE, a message including an indication of the periodicity. The communications manager 1420 may be configured as or otherwise support a means for monitoring for at least one safety message from the UE according to the periodicity and based on the indication of the periodicity.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reduced power consumption, more efficient utilization of communication resources, and improved coordination between devices. For example, the device 1405 may support reduced power consumption associated with reduced or optimized safety message transmission periodicities. The techniques for reduced power consumption may allow the device 1405 to reduce the processing overhead at the device 1405 and more efficiently perform safety message signaling. In some cases, the device 1405 may reduce a periodicity for safety message transmissions based on one or more environmental conditions, one or more parameters associated with the device 1405, which may reduce processing overhead at the device 1405 and reduce battery power utilization associated with the processing overhead.

Figure 15:
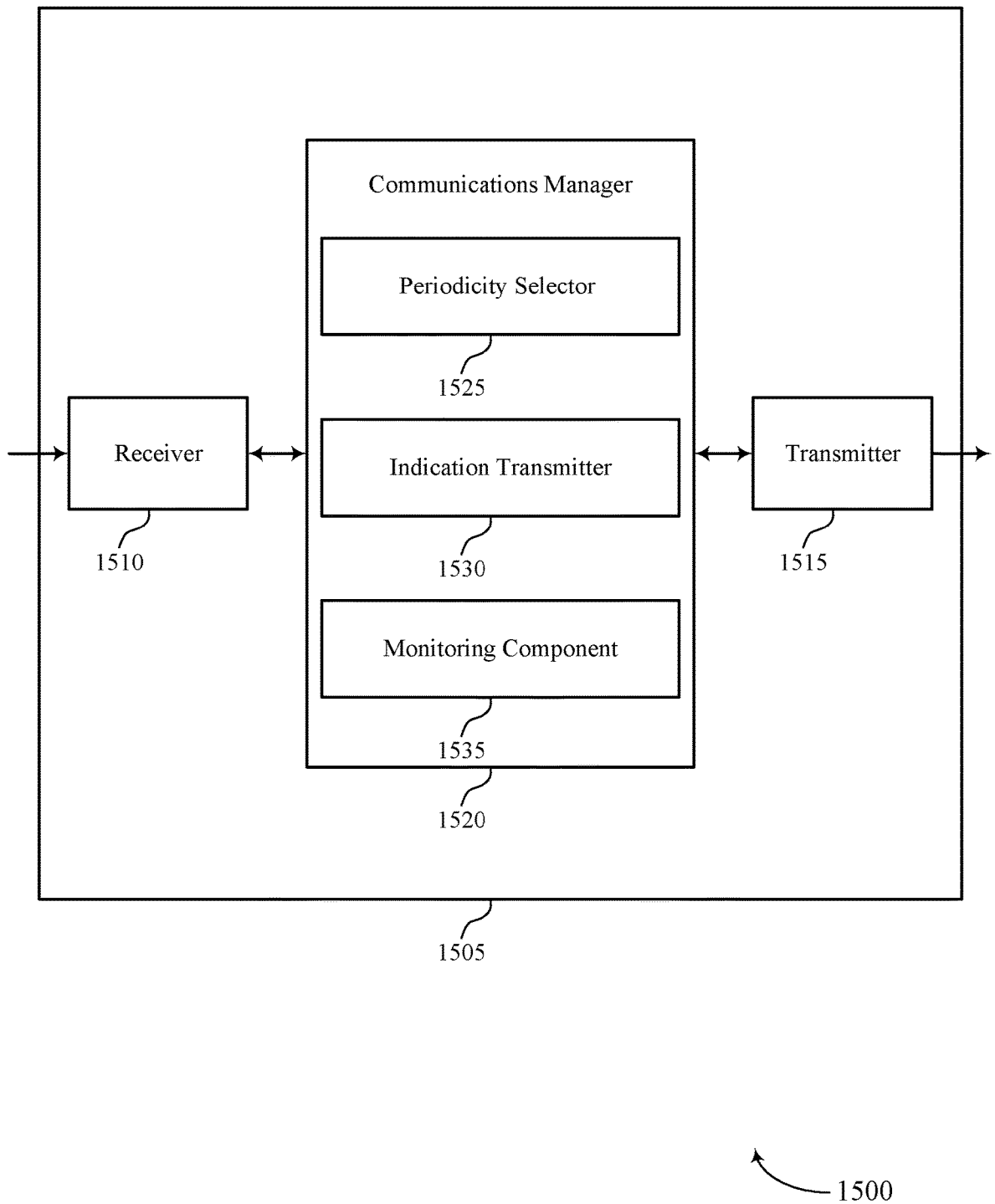

FIG. 15 shows a block diagram 1500 of a device 1505 that supports environment-dependent safety messaging in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to environment-dependent safety messaging). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to environment-dependent safety messaging). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of environment-dependent safety messaging as described herein. For example, the communications manager 1520 may include a periodicity selector 1525, an indication transmitter 1530, a monitoring component 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a base station in accordance with examples as disclosed herein. The periodicity selector 1525 may be configured as or otherwise support a means for selecting a periodicity of a set of transmission periodicities for safety message transmissions for a UE based on one or more environmental conditions associated with the UE. The indication transmitter 1530 may be configured as or otherwise support a means for transmitting, to the UE, a message including an indication of the periodicity. The monitoring component 1535 may be configured as or otherwise support a means for monitoring for at least one safety message from the UE according to the periodicity and based on the indication of the periodicity.

Figure 16:
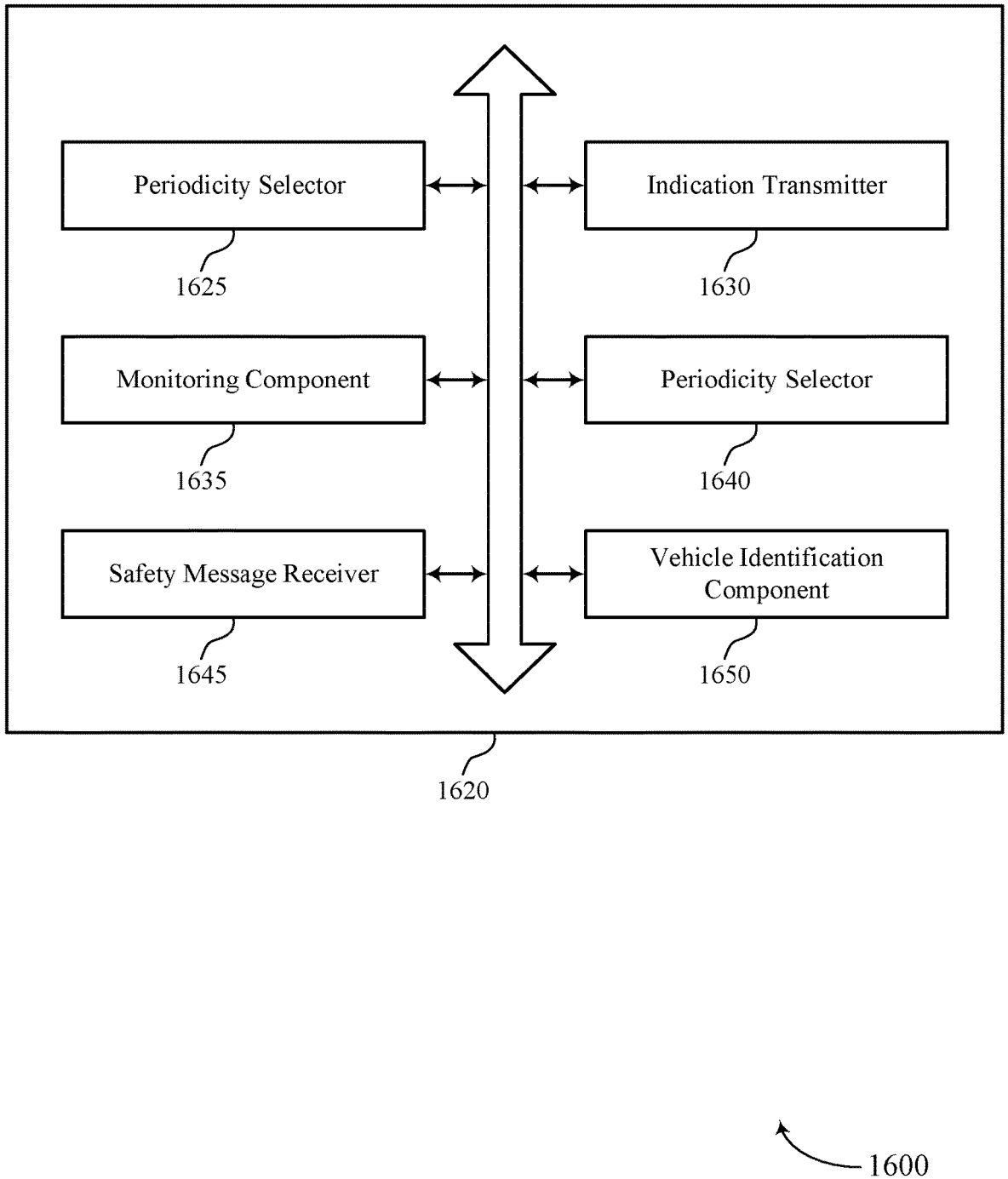
FIG. 16 shows a block diagram of a communications manager that supports environment-dependent safety messaging in accordance with aspects of the present disclosure.

FIG. 16 shows a block diagram 1600 of a communications manager 1620 that supports environment-dependent safety messaging in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of environment-dependent safety messaging as described herein. For example, the communications manager 1620 may include a periodicity selector 1625, an indication transmitter 1630, a monitoring component 1635, a periodicity selector 1640, a safety message receiver 1645, a vehicle identification component 1650, or any combination thereof. Each of these components may communicate, directly or indirectly, with one another (e.g., via one or more buses).

The communications manager 1620 may support wireless communications at a base station in accordance with examples as disclosed herein. The periodicity selector 1625 may be configured as or otherwise support a means for selecting a periodicity of a set of transmission periodicities for safety message transmissions for a UE based on one or more environmental conditions associated with the UE. The indication transmitter 1630 may be configured as or otherwise support a means for transmitting, to the UE, a message including an indication of the periodicity. The monitoring component 1635 may be configured as or otherwise support a means for monitoring for at least one safety message from the UE according to the periodicity and based on the indication of the periodicity.

In some examples, to support selecting the periodicity, the periodicity selector 1640 may be configured as or otherwise support a means for selecting the periodicity based on the topological information, where the topological information corresponds to a location of the UE and indicates a neighborhood type associated with the location of the UE, a presence of one or more potential obstructions between the UE and other UEs, geographical information associated with the location of the UE, or a combination thereof.

In some examples, to support selecting the periodicity, the periodicity selector 1640 may be configured as or otherwise support a means for selecting the periodicity based on the road information, where the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

In some examples, to support selecting the periodicity, the periodicity selector 1640 may be configured as or otherwise support a means for selecting the periodicity based on the visibility information, where the visibility information corresponds to a weather condition associated with a location of the UE, a time of day associated with the UE, or a combination thereof.

In some examples, to support selecting the periodicity, the periodicity selector 1640 may be configured as or otherwise support a means for selecting the periodicity based on a parameter associated with the UE, where the parameter includes a speed of the UE, an acceleration of the UE, an activity of the UE, historical information associated with the UE, or a combination thereof.

In some examples, the at least one safety message includes a personal safety message, a vulnerable road user awareness message, or an application-layer message.

In some examples, the safety message receiver 1645 may be configured as or otherwise support a means for receiving one or more safety messages from one or more other UEs, where the periodicity is selected from the set of transmission periodicities based on a quantity of the one or more safety messages relative to a threshold quantity.

In some examples, the vehicle identification component 1650 may be configured as or otherwise support a means for determining one or more vehicle types associated with the one or more safety messages, where the periodicity is selected based on the one or more vehicle types.

In some examples, to support selecting the periodicity, the safety message receiver 1645 may be configured as or otherwise support a means for selecting the periodicity greater than a first periodicity based on the quantity of the one or more safety messages being greater than the threshold quantity or selecting the periodicity less than the first periodicity based on the quantity of the one or more safety messages being less than the threshold quantity.

In some examples, the one or more safety messages includes one or more basic safety messages, one or more personal safety messages, one or more vulnerable road user awareness messages, one or more co-operative awareness messages, one or more decentralized environmental notification messages, one or more application-layer messages, one or more sensor sharing messages, one or more cooperative perception messages, one or more maneuver coordination messages, or any combination thereof.

Figure 17:
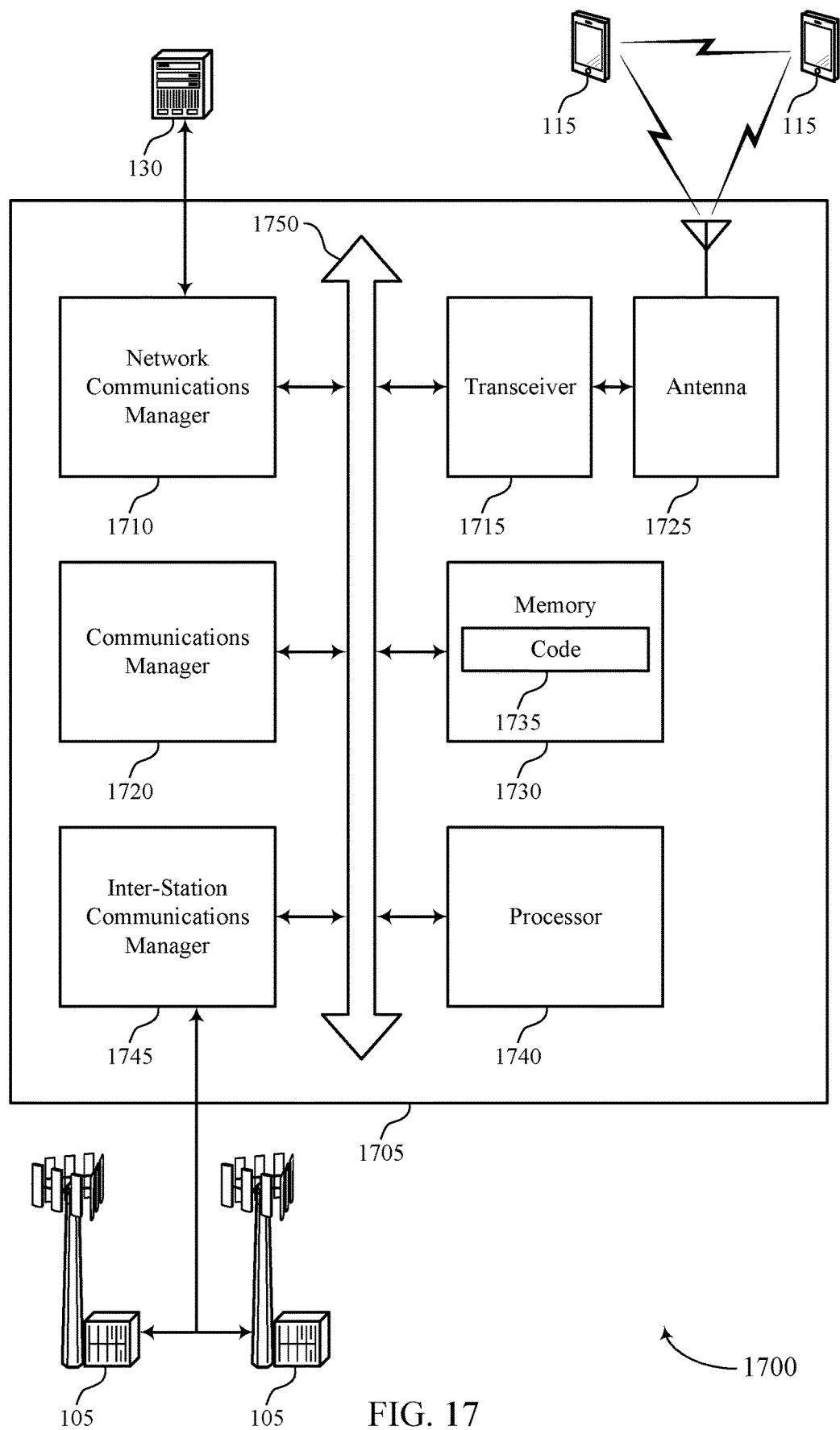
FIG. 17 shows a diagram of a system including a device that supports environment-dependent safety messaging in accordance with aspects of the present disclosure.

FIG. 17 shows a diagram of a system 1700 including a device 1705 that supports environment-dependent safety messaging in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting environment-dependent safety messaging). For example, the device 1705 or a component of the device 1705 may include a processor 1740 and memory 1730 coupled with the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communications at a base station in accordance with examples as disclosed herein. For example, the communications manager 1720 may be configured as or otherwise support a means for selecting a periodicity of a set of transmission periodicities for safety message transmissions for a UE based on one or more environmental conditions associated with the UE. The communications manager 1720 may be configured as or otherwise support a means for transmitting, to the UE, a message including an indication of the periodicity. The communications manager 1720 may be configured as or otherwise support a means for monitoring for at least one safety message from the UE according to the periodicity and based on the indication of the periodicity.

By including or configuring the communications manager 1720 in accordance with examples as described herein, the device 1705 may support techniques for reduced latency, reduced power consumption, more efficient utilization of communication resources, and improved coordination between devices. For example, the device 1705 may support reduced latency associated with reduced or optimized safety message transmission periodicities. In some cases, the device 1705 may increase a periodicity of safety message transmissions, which may decrease latency associated with receiving and processing the transmissions. In some other cases, the device 1705 may decrease a periodicity of safety message transmissions, which may reduce power consumption and may allow the device 1705 to more efficiently perform safety message signaling. In some cases, the device 1705 may select a periodicity for safety message transmissions based on one or more environmental conditions, one or more parameters associated with the device 1705, which may increase user safety In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of environment-dependent safety messaging as described herein, or the processor 1740 and the memory 1730 may be otherwise configured to perform or support such operations.

Figure 18:
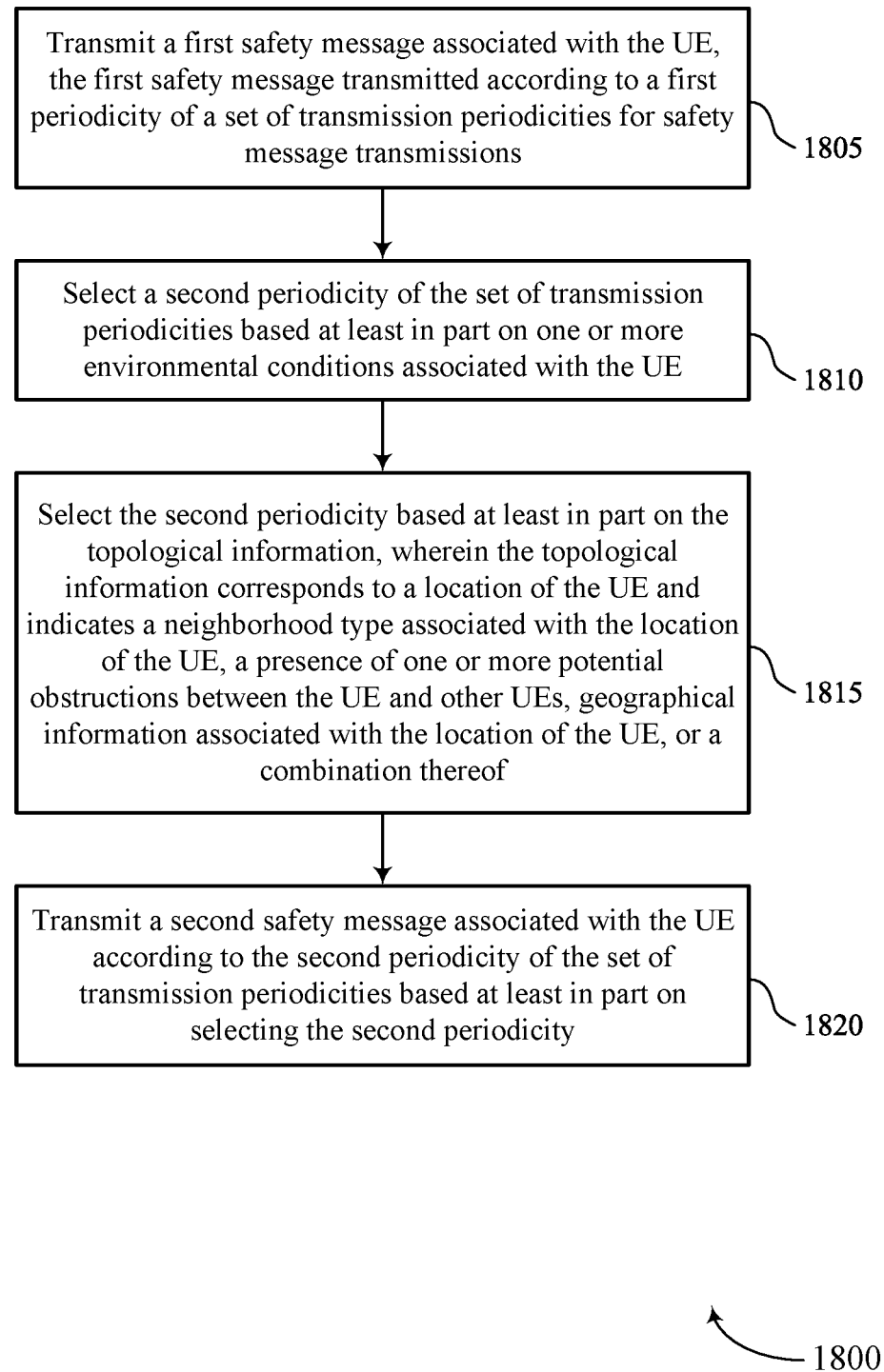
FIGS. 18 and 19 show flowcharts illustrating methods that support environment-dependent safety messaging in accordance with aspects of the present disclosure.

FIG. 18 shows a flowchart illustrating a method 1800 that supports environment-dependent safety messaging in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include transmitting a first safety message associated with the UE, the first safety message transmitted according to a first periodicity of a set of transmission periodicities for safety message transmissions. The operations of 1805 may be performed in accordance with examples as disclosed herein. In some examples, aspects of the operations of 1805 may be performed by a first safety message component 1225 as described with reference to FIG. 12.

At 1810, the method may include selecting a second periodicity of the set of transmission periodicities based on one or more environmental conditions associated with the UE. The operations of 1810 may be performed in accordance with examples as disclosed herein. In some examples, aspects of the operations of 1810 may be performed by a periodicity selection component 1230 as described with reference to FIG. 12.

At 1815, the method may include selecting the second periodicity based on the topological information, where the topological information corresponds to a location of the UE and indicates a neighborhood type associated with the location of the UE, a presence of one or more potential obstructions between the UE and other UEs, geographical information associated with the location of the UE, or a combination thereof. The operations of 1815 may be performed in accordance with examples as disclosed herein. In some examples, aspects of the operations of 1815 may be performed by a periodicity selection component 1230 as described with reference to FIG. 12.

At 1820, the method may include transmitting a second safety message associated with the UE according to the second periodicity of the set of transmission periodicities based on selecting the second periodicity. The operations of 1820 may be performed in accordance with examples as disclosed herein. In some examples, aspects of the operations of 1820 may be performed by a second safety message component 1235 as described with reference to FIG. 12.

Figure 19:
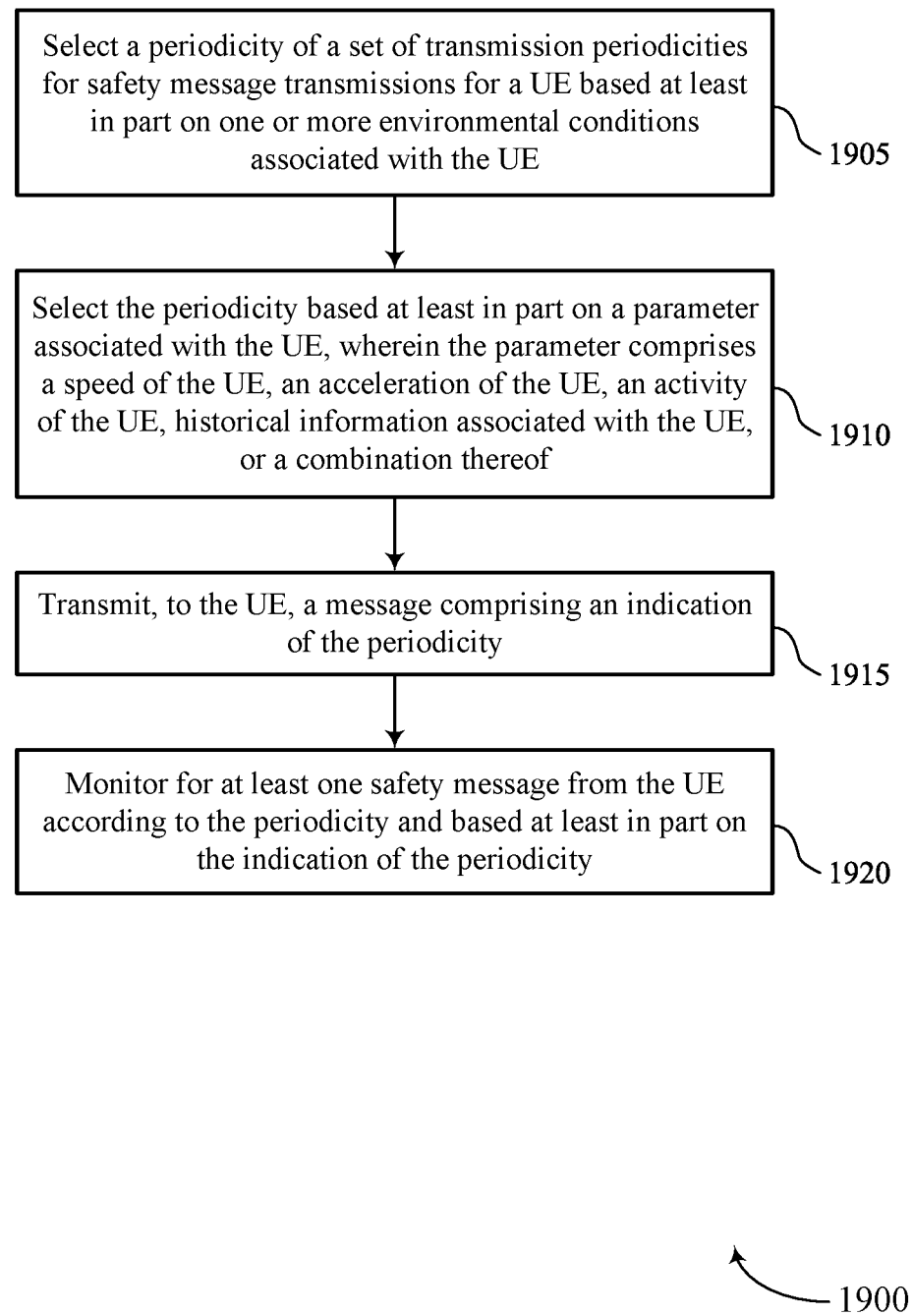

FIG. 19 shows a flowchart illustrating a method 1900 that supports environment-dependent safety messaging in accordance with aspects of the present disclosure. The operations of the method 1900 may be implemented by a base station or its components as described herein. For example, the operations of the method 1900 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 1905, the method may include selecting a periodicity of a set of transmission periodicities for safety message transmissions for a UE based on one or more environmental conditions associated with the UE. The operations of 1905 may be performed in accordance with examples as disclosed herein. In some examples, aspects of the operations of 1905 may be performed by a periodicity selector 1625 as described with reference to FIG. 16.

At 1910, the method may include selecting the periodicity based on a parameter associated with the UE, where the parameter includes a speed of the UE, an acceleration of the UE, an activity of the UE, historical information associated with the UE, or a combination thereof. The operations of 1910 may be performed in accordance with examples as disclosed herein. In some examples, aspects of the operations of 1910 may be performed by a periodicity selector 1640 as described with reference to FIG. 16.

At 1915, the method may include transmitting, to the UE, a message including an indication of the periodicity. The operations of 1915 may be performed in accordance with examples as disclosed herein. In some examples, aspects of the operations of 1915 may be performed by an indication transmitter 1630 as described with reference to FIG. 16.

At 1920, the method may include monitoring for at least one safety message from the UE according to the periodicity and based on the indication of the periodicity. The operations of 1920 may be performed in accordance with examples as disclosed herein. In some examples, aspects of the operations of 1920 may be performed by a monitoring component 1635 as described with reference to FIG. 16.

The following provides an overview of aspects of the present disclosure:

Aspect 1: A method for wireless communications at a UE, comprising: transmitting a first safety message associated with the UE, the first safety message transmitted according to a first periodicity of a set of transmission periodicities for safety message transmissions: selecting a second periodicity of the set of transmission periodicities based at least in part on one or more environmental conditions associated with the UE: and transmitting a second safety message associated with the UE according to the second periodicity of the set of transmission periodicities based at least in part on selecting the second periodicity.

Aspect 2: The method of aspect 1, wherein the one or more environmental conditions comprises topological information wherein selecting the second periodicity comprises: selecting the second periodicity based at least in part on the topological information, wherein the topological information corresponds to a location of the UE and indicates a neighborhood type associated with the location of the UE, a presence of one or more potential obstructions between the UE and other UEs, geographical information associated with the location of the UE, or a combination thereof.

Aspect 3: The method of aspect 1, wherein the one or more environmental conditions comprises road information, wherein selecting the second periodicity comprises: selecting the second periodicity based at least in part on the road information, wherein the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

Aspect 4: The method of aspect 1, wherein the one or more environmental conditions comprises visibility information, wherein selecting the second periodicity comprises: selecting the second periodicity based at least in part on the visibility information, wherein the visibility information corresponds to a weather condition associated with a location of the UE, a time of day associated with the UE, or a combination thereof.

Aspect 5: The method of any of aspects 1 through 4, wherein selecting the second periodicity comprises: selecting the second periodicity based at least in part on a parameter associated with the UE, wherein the parameter comprises a speed of the UE, an acceleration of the UE, an activity of the UE, historical information associated with the UE, or a combination thereof.

Aspect 6: The method of any of aspects 1 through 5, further comprising: activating at least one of an audio component or a video component of the UE; and detecting the one or more environmental conditions based at least in part on activating at least one of the audio component or the video component of the UE.

Aspect 7: The method of aspect 6, wherein detecting the one or more environmental conditions further comprises: detecting a topology, a neighborhood type, a presence of one or more obstructions, a presence of a shoulder, a presence of a sidewalk, a quantity of vehicles, a visibility condition, or a combination thereof.

Aspect 8: The method of any of aspects 1 through 7, wherein the first safety message, the second safety message, or both comprises a personal safety message, a vulnerable road user awareness message, or an application-layer message.

Aspect 9: The method of any of aspects 1 through 8, further comprising: receiving one or more safety messages from one or more other UEs, wherein the second periodicity is selected from the set of transmission periodicities based at least in part on a quantity of the one or more safety messages relative to a threshold quantity.

Aspect 10: The method of aspect 9, further comprising: determining one or more vehicle types associated with the one or more safety messages, wherein the second periodicity is selected based at least in part on the one or more vehicle types.

Aspect 11: The method of any of aspects 9 through 10, wherein selecting the second periodicity further comprises: selecting the second periodicity greater than the first periodicity based at least in part on the quantity of the one or more safety messages being greater than the threshold quantity or selecting the second periodicity less than the first periodicity based at least in part on the quantity of the one or more safety messages being less than the threshold quantity.

Aspect 12: The method of any of aspects 9 through 11, wherein the one or more safety messages comprises one or more basic safety messages, one or more personal safety messages, one or more vulnerable road user awareness messages, one or more co-operative awareness messages, one or more decentralized environmental notification messages, one or more application-layer messages, or any combination thereof.

Aspect 13: A method for wireless communications at a base station, comprising: selecting a periodicity of a set of transmission periodicities for safety message transmissions for a UE based at least in part on one or more environmental conditions associated with the UE: transmitting, to the UE, a message comprising an indication of the periodicity: and monitoring for at least one safety message from the UE according to the periodicity and based at least in part on the indication of the periodicity.

Aspect 14: The method of aspect 13, wherein the one or more environmental conditions comprises topological information wherein selecting the periodicity comprises: selecting the periodicity based at least in part on the topological information, wherein the topological information corresponds to a location of the UE and indicates a neighborhood type associated with the location of the UE, a presence of one or more potential obstructions between the UE and other UEs, geographical information associated with the location of the UE, or a combination thereof.

Aspect 15: The method of aspect 13, wherein the one or more environmental conditions comprises road information, wherein selecting the periodicity comprises: selecting the periodicity based at least in part on the road information, wherein the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

Aspect 16: The method of aspect 13, wherein the one or more environmental conditions comprises visibility information, wherein selecting the periodicity comprises: selecting the periodicity based at least in part on the visibility information, wherein the visibility information corresponds to a weather condition associated with a location of the UE, a time of day associated with the UE, or a combination thereof.

Aspect 17: The method of any of aspects 13 through 16, wherein selecting the periodicity comprises: selecting the periodicity based at least in part on a parameter associated with the UE, wherein the parameter comprises a speed of the UE, an acceleration of the UE, an activity of the UE, historical information associated with the UE, or a combination thereof.

Aspect 18: The method of any of aspects 13 through 17, wherein the at least one safety message comprises a personal safety message, a vulnerable road user awareness message, or an application-layer message.

Aspect 19: The method of any of aspects 13 through 18, further comprising: receiving one or more safety messages from one or more other UEs, wherein the periodicity is selected from the set of transmission periodicities based at least in part on a quantity of the one or more safety messages relative to a threshold quantity.

Aspect 20: The method of aspect 19, further comprising: determining one or more vehicle types associated with the one or more safety messages, wherein the periodicity is selected based at least in part on the one or more vehicle types.

Aspect 21: The method of any of aspects 19 through 20, wherein selecting the periodicity further comprises: selecting the periodicity greater than a first periodicity based at least in part on the quantity of the one or more safety messages being greater than the threshold quantity or selecting the periodicity less than the first periodicity based at least in part on the quantity of the one or more safety messages being less than the threshold quantity.

Aspect 22: The method of any of aspects 19 through 21, wherein the one or more safety messages comprises one or more basic safety messages, one or more personal safety messages, one or more vulnerable road user awareness messages, one or more co-operative awareness messages, one or more decentralized environmental notification messages, one or more application-layer messages, one or more sensor sharing messages, one or more cooperative perception messages, one or more maneuver coordination messages, or any combination thereof.

Aspect 23: An apparatus for wireless communications at a UE, comprising a processor: memory coupled with the processor: and instructions stored in the memory and executable by the processor to cause the apparatus to perform a method of any of aspects 1 through 12.

Aspect 24: An apparatus for wireless communications at a UE, comprising at least one means for performing a method of any of aspects 1 through 12.

Aspect 25: A non-transitory computer-readable medium storing code for wireless communications at a UE, the code comprising instructions executable by a processor to perform a method of any of aspects 1 through 12.

Aspect 26: An apparatus for wireless communications at a base station, comprising a processor: memory coupled with the processor: and instructions stored in the memory and executable by the processor to cause the apparatus to perform a method of any of aspects 13 through 22.

Aspect 27: An apparatus for wireless communications at a base station, comprising at least one means for performing a method of any of aspects 13 through 22.

Aspect 28: A non-transitory computer-readable medium storing code for wireless communications at a base station, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting a first safety message associated with the UE, the first safety message transmitted according to a first periodicity of a set of transmission periodicities for safety message transmissions;
    activating at least one of an audio component or a video component of the UE;
    detecting one or more environmental conditions associated with the UE based at least in part on activating at least one of the audio component or the video component of the UE;
    selecting a second periodicity of the set of transmission periodicities based at least in part on the one or more environmental conditions associated with the UE; and
    transmitting a second safety message associated with the UE according to the second periodicity of the set of transmission periodicities based at least in part on selecting the second periodicity.

2. The method of claim 1, wherein the one or more environmental conditions comprises topological information wherein selecting the second periodicity comprises:
    selecting the second periodicity based at least in part on the topological information, wherein the topological information corresponds to a location of the UE and indicates a neighborhood type associated with the location of the UE, a presence of one or more potential obstructions between the UE and other UEs, geographical information associated with the location of the UE, or a combination thereof.

3. The method of claim 1, wherein the one or more environmental conditions comprises road information, wherein selecting the second periodicity comprises:
    selecting the second periodicity based at least in part on the road information, wherein the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

4. The method of claim 1, wherein the one or more environmental conditions comprises visibility information, wherein selecting the second periodicity comprises:
    selecting the second periodicity based at least in part on the visibility information, wherein the visibility information corresponds to a weather condition associated with a location of the UE, a time of day associated with the UE, or a combination thereof.

5. The method of claim 1, wherein selecting the second periodicity comprises:
    selecting the second periodicity based at least in part on a parameter associated with the UE, wherein the parameter comprises a speed of the UE, an acceleration of the UE, an activity of the UE, historical information associated with the UE, or a combination thereof.

6. The method of claim 1, wherein detecting the one or more environmental conditions further comprises:
    detecting a topology, a neighborhood type, a presence of one or more obstructions, a presence of a shoulder, a presence of a sidewalk, a quantity of vehicles, a visibility condition, or a combination thereof.

7. The method of claim 1, wherein the first safety message, the second safety message, or both comprises a personal safety message, a vulnerable road user awareness message, or an application-layer message.

8. The method of claim 1, further comprising:
receiving one or more safety messages from one or more other UEs, wherein the second periodicity is selected from the set of transmission periodicities based at least in part on a quantity of the one or more safety messages relative to a threshold quantity.

9. The method of claim 8, further comprising:
determining one or more vehicle types associated with the one or more safety messages, wherein the second periodicity is selected based at least in part on the one or more vehicle types.

10. The method of claim 8, wherein selecting the second periodicity further comprises:
selecting the second periodicity greater than the first periodicity based at least in part on the quantity of the one or more safety messages being greater than the threshold quantity or selecting the second periodicity less than the first periodicity based at least in part on the quantity of the one or more safety messages being less than the threshold quantity.

11. The method of claim 8, wherein the one or more safety messages comprises one or more basic safety messages, one or more personal safety messages, one or more vulnerable road user awareness messages, one or more co-operative awareness messages, one or more decentralized environmental notification messages, one or more application-layer messages, or any combination thereof.

12. A method for wireless communications at a network device, comprising:
activating at least one of an audio component or a video component of the network device;
detecting one or more environmental conditions associated with a user equipment (UE) based at least in part on activating at least one of the audio component or the video component of the network device;
selecting a periodicity of a set of transmission periodicities for safety message transmissions for the UE based at least in part on detecting the one or more environmental conditions associated with the UE;
transmitting, to the UE, a message comprising an indication of the periodicity; and
monitoring for at least one safety message from the UE according to the periodicity and based at least in part on the indication of the periodicity.

13. The method of claim 12, wherein the one or more environmental conditions comprises topological information wherein selecting the periodicity comprises:
selecting the periodicity based at least in part on the topological information, wherein the topological information corresponds to a location of the UE and indicates a neighborhood type associated with the location of the UE, a presence of one or more potential obstructions between the UE and other UEs, geographical information associated with the location of the UE, or a combination thereof.

14. The method of claim 12, wherein the one or more environmental conditions comprises road information, wherein selecting the periodicity comprises:
selecting the periodicity based at least in part on the road information, wherein the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

15. The method of claim 12, wherein the one or more environmental conditions comprises visibility information, wherein selecting the periodicity comprises:
selecting the periodicity based at least in part on the visibility information, wherein the visibility information corresponds to a weather condition associated with a location of the UE, a time of day associated with the UE, or a combination thereof.

16. The method of claim 12, wherein selecting the periodicity comprises:
selecting the periodicity based at least in part on a parameter associated with the UE, wherein the parameter comprises a speed of the UE, an acceleration of the UE, an activity of the UE, historical information associated with the UE, or a combination thereof.

17. The method of claim 12, wherein the at least one safety message comprises a personal safety message, a vulnerable road user awareness message, or an application-layer message.

18. The method of claim 12, further comprising:
receiving one or more safety messages from one or more other UEs, wherein the periodicity is selected from the set of transmission periodicities based at least in part on a quantity of the one or more safety messages relative to a threshold quantity.

19. The method of claim 18, further comprising:
determining one or more vehicle types associated with the one or more safety messages, wherein the periodicity is selected based at least in part on the one or more vehicle types.

20. The method of claim 18, wherein selecting the periodicity further comprises:
selecting the periodicity greater than a first periodicity based at least in part on the quantity of the one or more safety messages being greater than the threshold quantity or selecting the periodicity less than the first periodicity based at least in part on the quantity of the one or more safety messages being less than the threshold quantity.

21. The method of claim 18, wherein the one or more safety messages comprises one or more basic safety messages, one or more personal safety messages, one or more vulnerable road user awareness messages, one or more co-operative awareness messages, one or more decentralized environmental notification messages, one or more application-layer messages, one or more sensor sharing messages, one or more cooperative perception messages, one or more maneuver coordination messages, or any combination thereof.

22. An apparatus for wireless communications at a user equipment (UE), comprising:
at least one processor;
at least one memory coupled with the at least one processor; and
instructions stored in the at least one memory and executable by the at least one processor to cause the apparatus to:
transmit a first safety message associated with the UE, the first safety message transmitted according to a first periodicity of a set of transmission periodicities for safety message transmissions;
activate at least one of an audio component or a video component of the UE;

detect one or more environmental conditions associated with the UE based at least in part on activating at least one of the audio component or the video component of the UE;

select a second periodicity of the set of transmission periodicities based at least in part on the one or more environmental conditions associated with the UE; and transmit a second safety message associated with the UE according to the second periodicity of the set of transmission periodicities based at least in part on selecting the second periodicity.

23. The apparatus of claim 22, wherein the instructions to select the second periodicity are executable by the at least one processor to cause the apparatus to:

select the second periodicity based at least in part on topological information, wherein the topological information corresponds to a location of the UE and indicates a neighborhood type associated with the location of the UE, a presence of one or more potential obstructions between the UE and other UEs, geographical information associated with the location of the UE, or a combination thereof.

24. The apparatus of claim 22, wherein the instructions to select the second periodicity are executable by the at least one processor to cause the apparatus to:

select the second periodicity based at least in part on road information, wherein the road information indicates a road topology, a presence of a sidewalk, a presence of a shoulder, a presence of a bicycle lane, a presence of a median, one or more intersections, a number of lanes, a presence of one or more turning lanes, one or more lane widths, or a combination thereof.

25. The apparatus of claim 22, wherein the instructions to select the second periodicity are executable by the at least one processor to cause the apparatus to:

select the second periodicity based at least in part on visibility information, wherein the visibility information corresponds to a weather condition associated with a location of the UE, a time of day associated with the UE, or a combination thereof.

26. The apparatus of claim 22, wherein the instructions to select the second periodicity are executable by the at least one processor to cause the apparatus to:

select the second periodicity based at least in part on a parameter associated with the UE, wherein the parameter comprises a speed of the UE, an acceleration of the UE, an activity of the UE, historical information associated with the UE, or a combination thereof.

27. The apparatus of claim 22, wherein the first safety message, the second safety message, or both comprises a personal safety message, a vulnerable road user awareness message, or an application-layer message.

28. An apparatus for wireless communications at a network device, comprising:

at least one processor;

at least one memory coupled with the at least one processor; and instructions stored in the at least one memory and executable by the at least one processor to cause the apparatus to:

activating at least one of an audio component or a video component of the network device;

detecting one or more environmental conditions associated with a user equipment (UE) based at least in part on activating at least one of the audio component or the video component of the network device;

select a periodicity of a set of transmission periodicities for safety message transmissions for the UE based at least in part on detecting the one or more environmental conditions associated with the UE;

transmit, to the UE, a message comprising an indication of the periodicity; and monitor for at least one safety message from the UE according to the periodicity and based at least in part on the indication of the periodicity.

* * * * *